US011453556B2

(12) United States Patent
Wargo

(10) Patent No.: US 11,453,556 B2
(45) Date of Patent: Sep. 27, 2022

(54) STEPPED ACCUMULATION CHUTE

(71) Applicant: Impact Automation, Inc., Columbia, MD (US)

(72) Inventor: Stephen G. Wargo, Columbia, MD (US)

(73) Assignee: Impact Automation, Inc., Columbia, MD (US)

( * ) Notice: Subject to any disclaimer, the term of this patent is extended or adjusted under 35 U.S.C. 154(b) by 101 days.

(21) Appl. No.: 17/141,668

(22) Filed: Jan. 5, 2021

(65) Prior Publication Data

US 2022/0212872 A1 Jul. 7, 2022

(51) Int. Cl.
*B65G 11/08* (2006.01)
*B65G 11/04* (2006.01)
*B65G 11/20* (2006.01)
*B65G 47/31* (2006.01)
*B07C 1/04* (2006.01)
*B65G 11/18* (2006.01)

(52) U.S. Cl.
CPC .............. *B65G 11/081* (2013.01); *B07C 1/04* (2013.01); *B65G 11/04* (2013.01); *B65G 11/183* (2013.01); *B65G 11/203* (2013.01); *B65G 47/31* (2013.01); *B65G 2201/0285* (2013.01)

(58) Field of Classification Search
CPC ..... B65G 11/081; B65G 11/04; B65G 11/183; B65G 11/203; B65G 47/31; B65G 2201/0285; B65G 11/088; B07C 1/04
USPC .......................................... 198/541, 546, 563
See application file for complete search history.

(56) References Cited

U.S. PATENT DOCUMENTS

| | | | |
|---|---|---|---|
| 807,362 A * | 12/1905 | DeLong ........................ | 198/546 |
| 2,905,309 A | 9/1959 | Makrides | |
| 3,236,355 A | 2/1966 | Barnard et al. | |
| 3,894,508 A * | 7/1975 | Burgess .............. | A21C 15/002 |
| | | | 198/409 |
| 4,232,778 A | 11/1980 | Rysti | |
| 5,069,440 A | 12/1991 | Lazzarotti et al. | |
| 5,236,077 A | 8/1993 | Hoppmann et al. | |
| 5,638,938 A | 6/1997 | Lazzarotti et al. | |
| 6,259,967 B1 | 7/2001 | Hartlepp et al. | |
| 6,637,600 B2 | 10/2003 | Miyamoto et al. | |
| 9,278,809 B2 * | 3/2016 | Lykkegaard ........... | B65G 47/26 |
| 9,415,936 B1 * | 8/2016 | Rodriguez ........... | B65G 11/163 |
| 9,878,349 B2 | 1/2018 | Crest et al. | |
| 9,969,554 B2 * | 5/2018 | Hartmann ............ | B65G 11/203 |
| 2002/0060129 A1 | 5/2002 | Cooper, III et al. | |

FOREIGN PATENT DOCUMENTS

| | | |
|---|---|---|
| CH | 634527 A5 | 5/1983 |
| CN | 106269540 B | 4/2019 |
| GB | 1008082 | 10/1965 |
| GB | 1059130 | 2/1967 |

(Continued)

*Primary Examiner* — Mark A Deuble
(74) *Attorney, Agent, or Firm* — Rahman LLC

(57) ABSTRACT

An apparatus and system include an upper stepped chute having a substantially downward sloped configuration; a lower stepped chute having a substantially downward sloped configuration; and an intermediate conveyor section separating the upper stepped chute from the lower stepped chute. The intermediate conveyor section has a slope that is different from the slope of the upper stepped chute and the lower stepped chute.

20 Claims, 39 Drawing Sheets

(56) References Cited

FOREIGN PATENT DOCUMENTS

| | | |
|---|---|---|
| JP | 4067425 B2 | 3/2008 |
| JP | 5420155 B2 | 2/2014 |
| WO | 9632207 A1 | 10/1996 |

\* cited by examiner

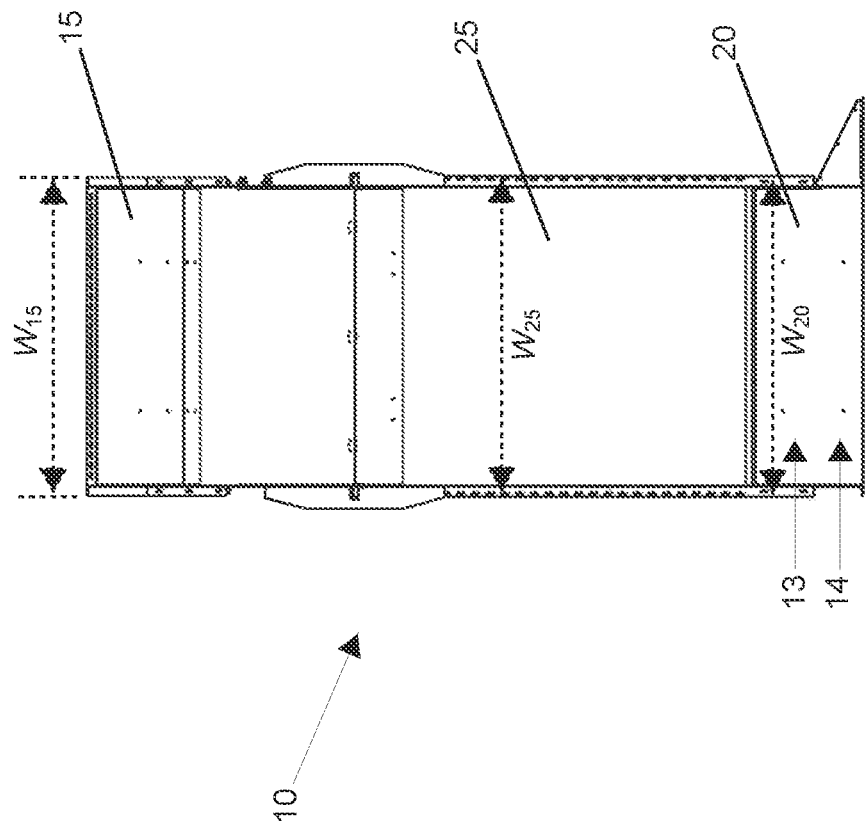

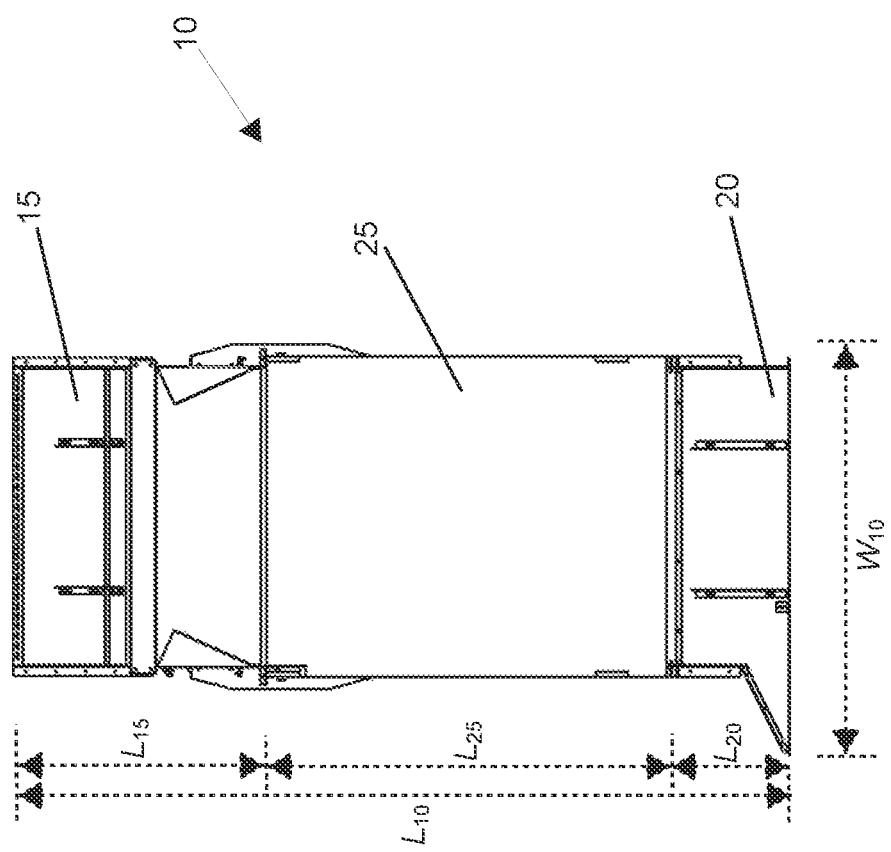

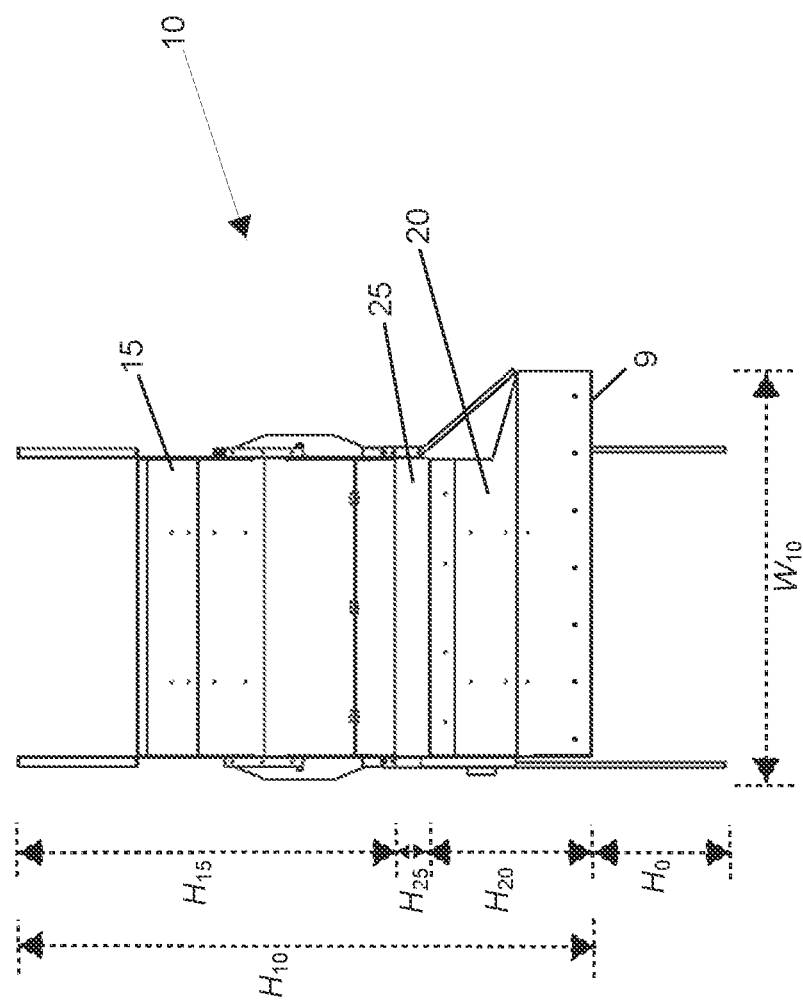

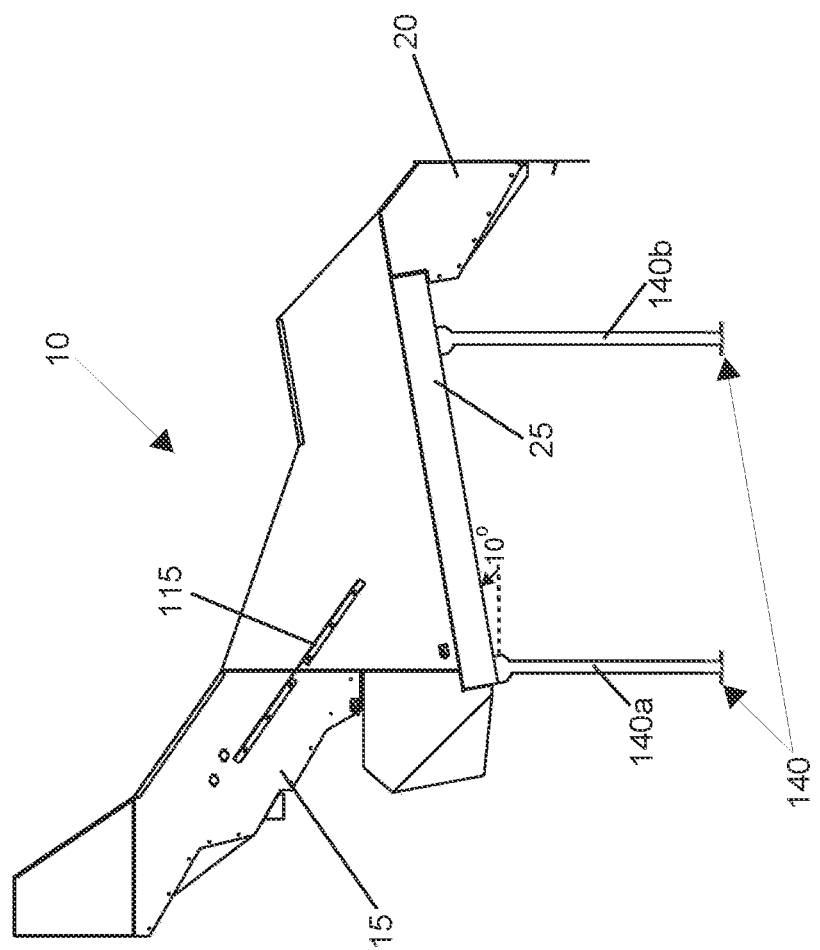

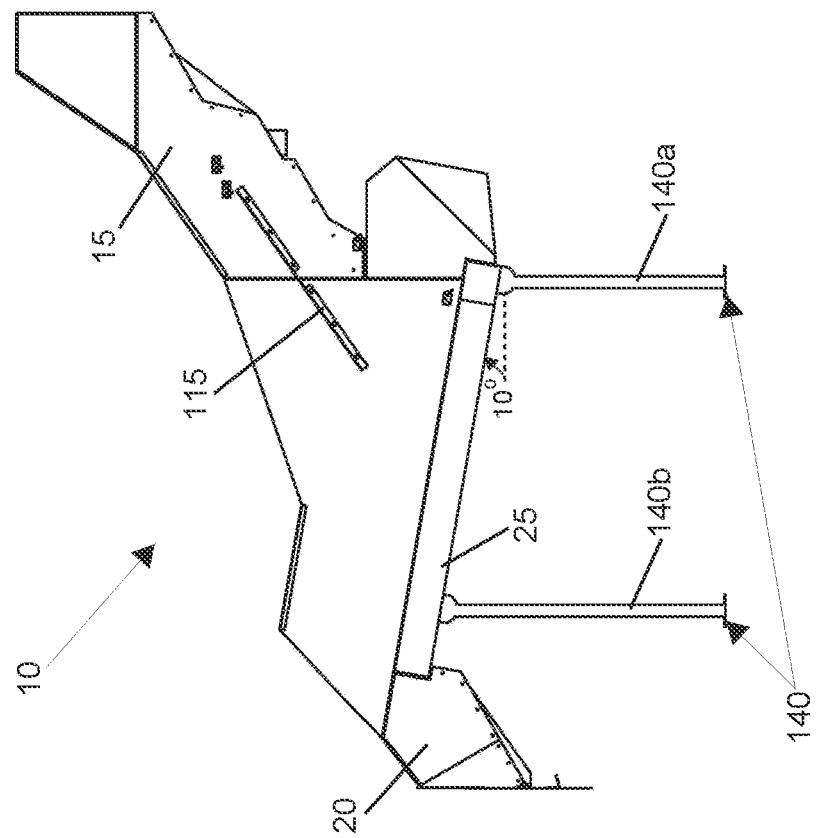

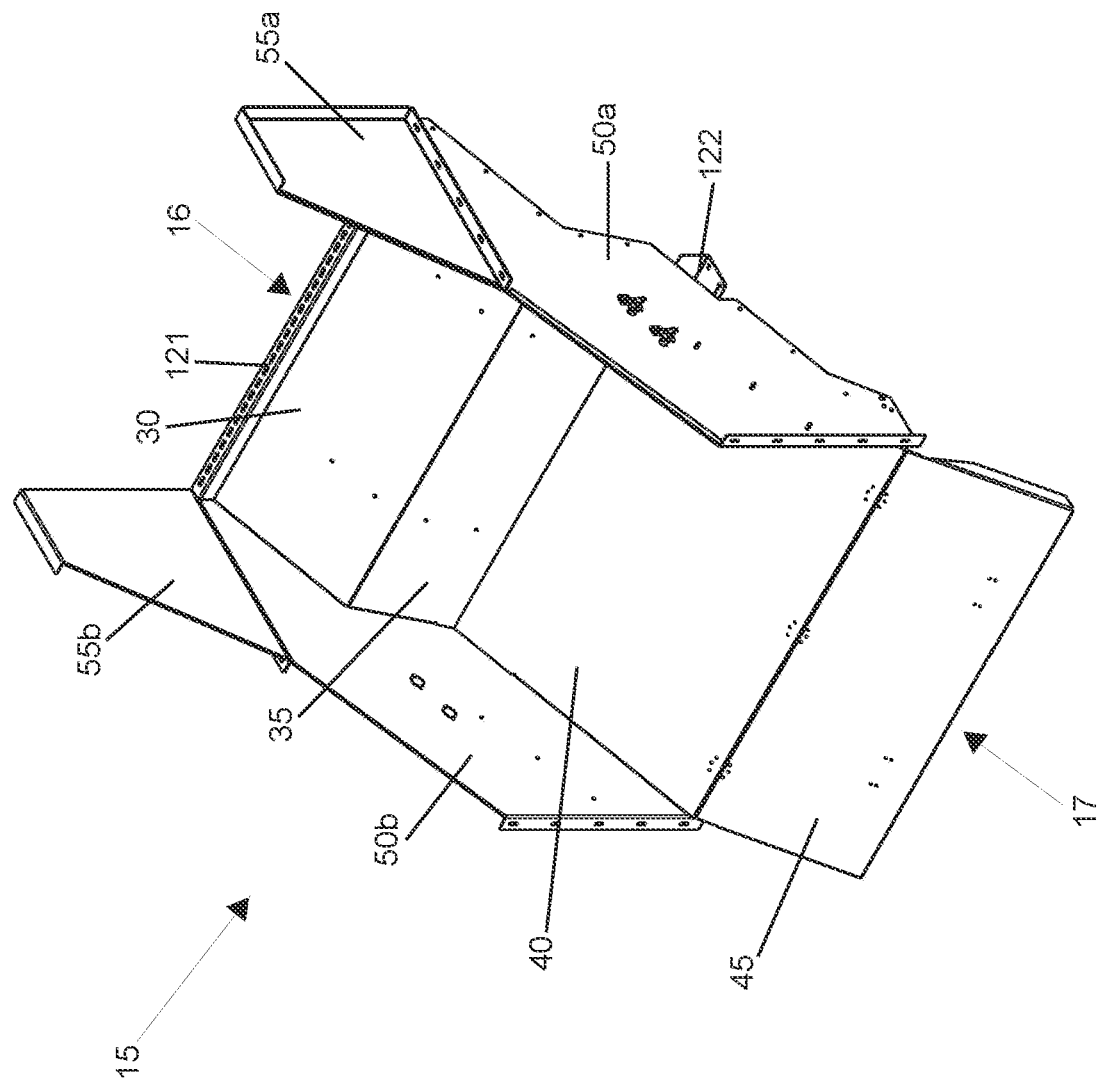

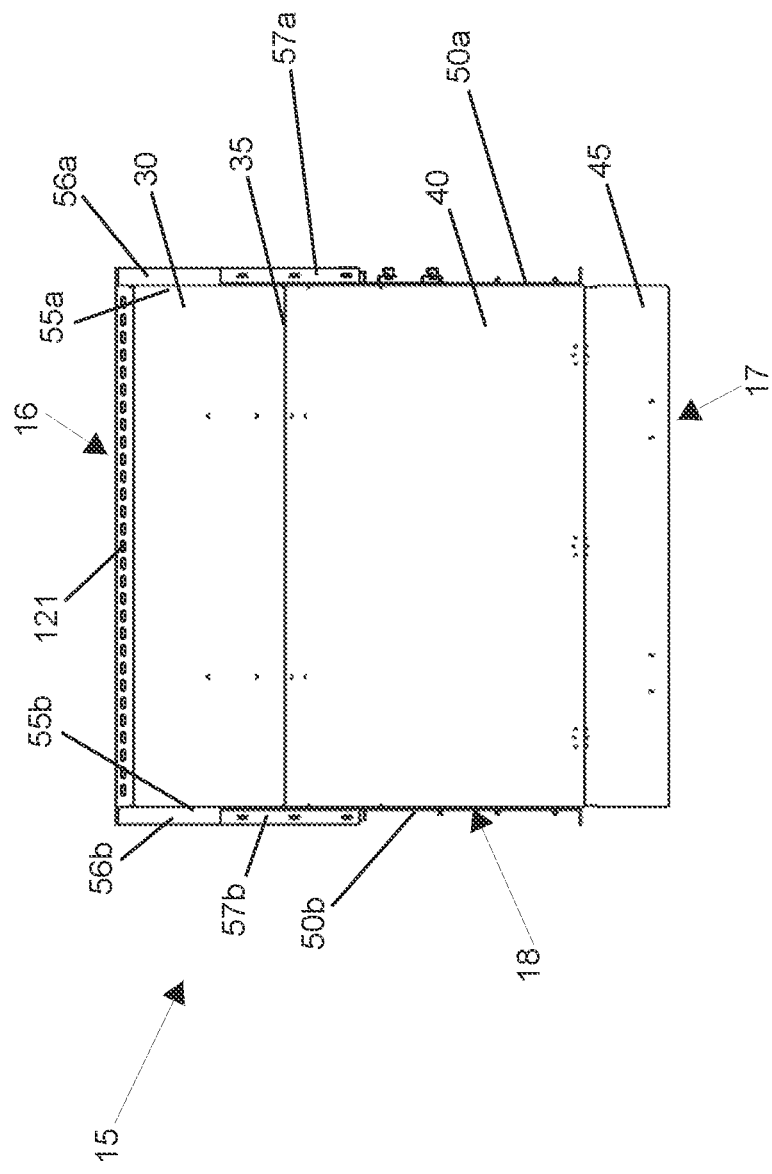

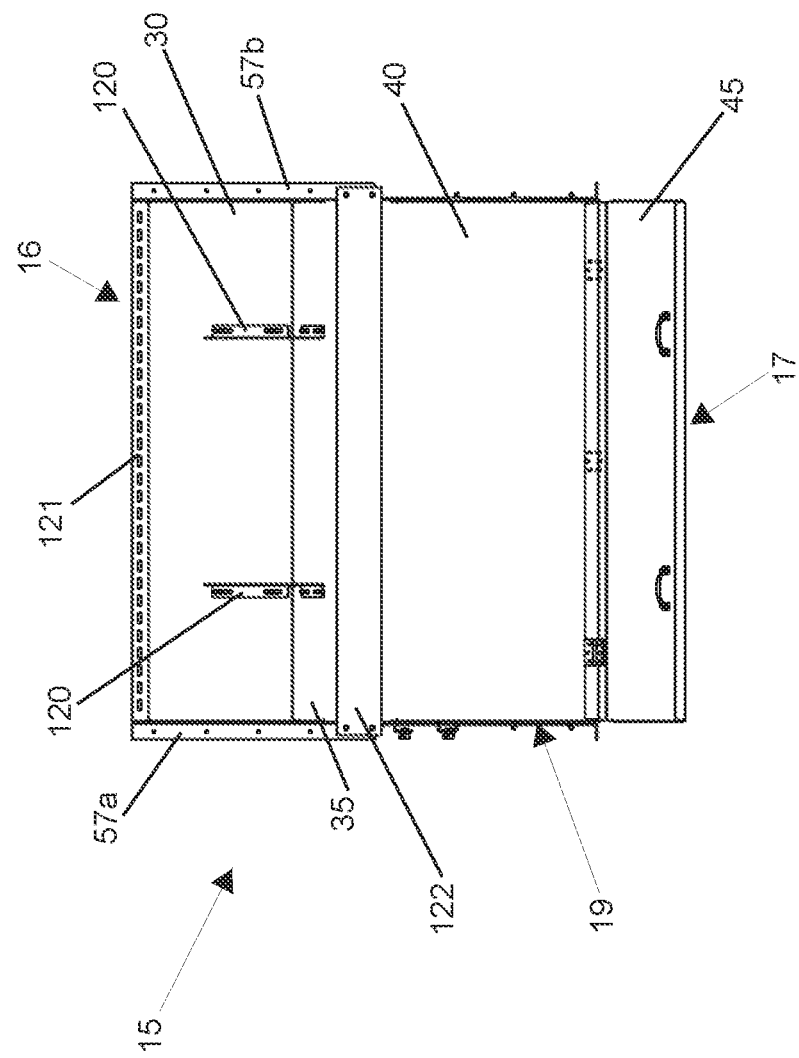

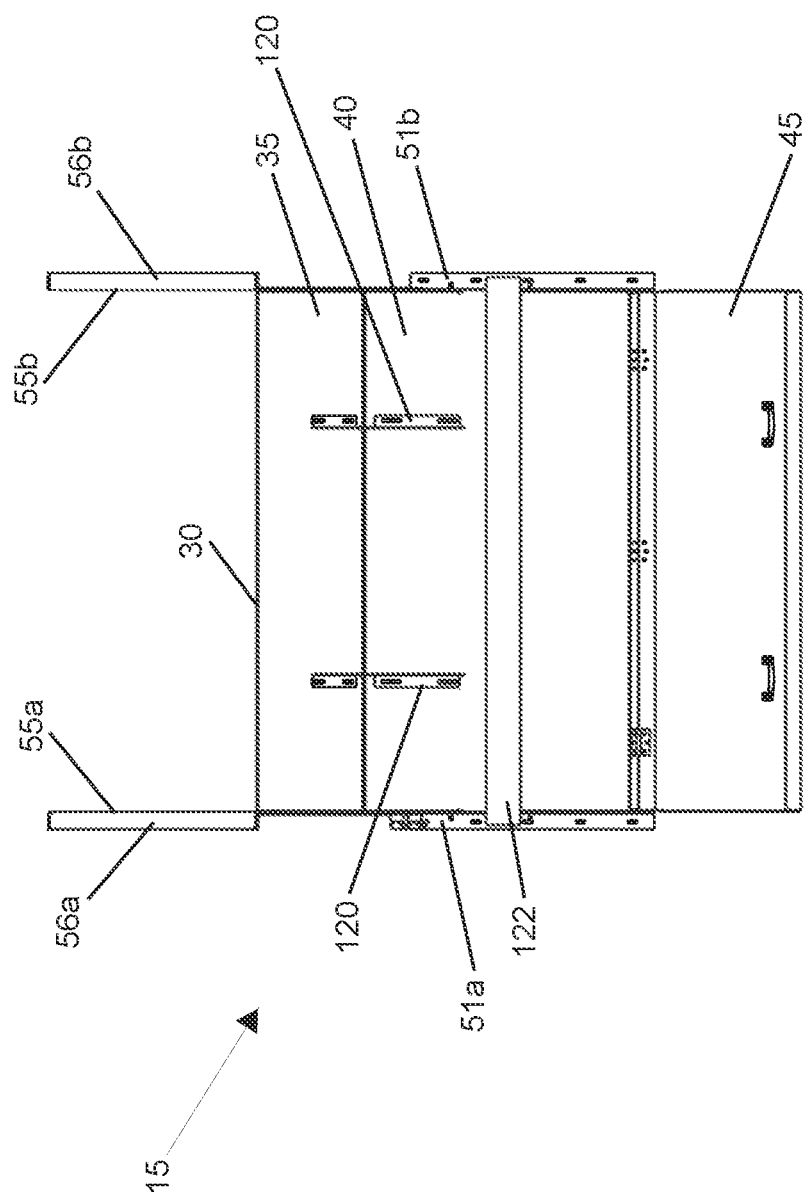

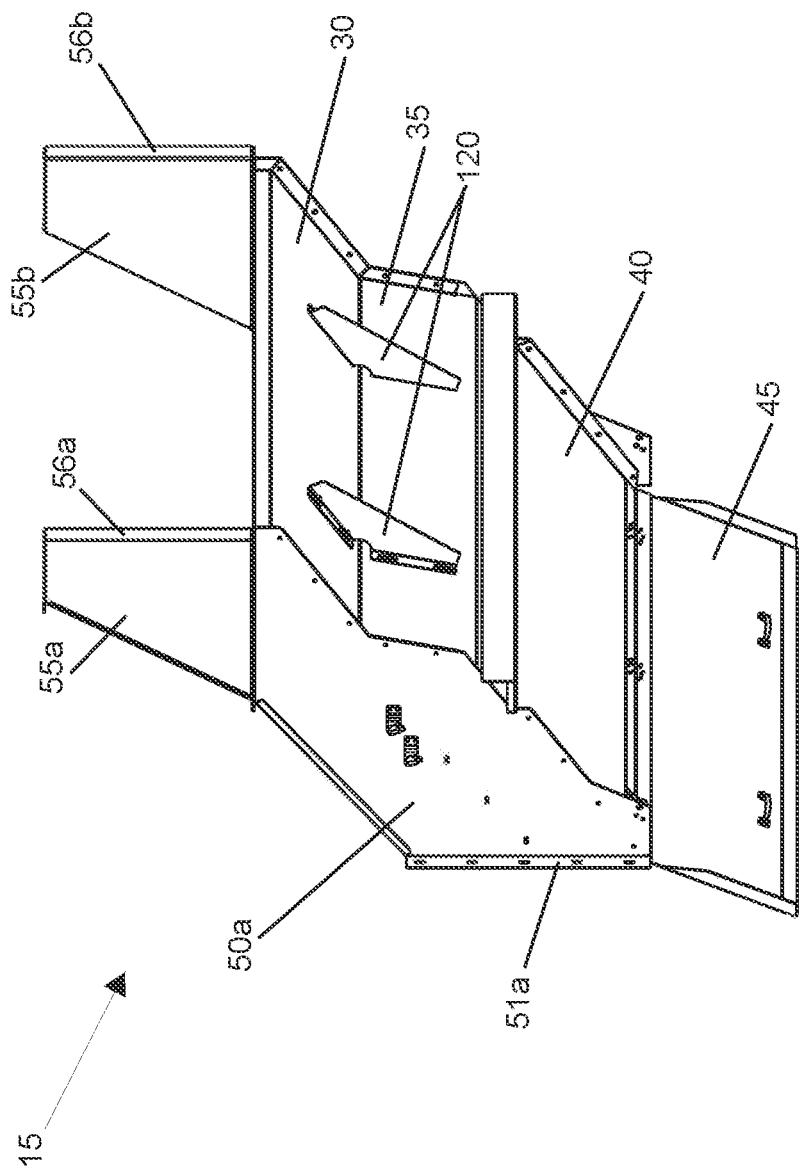

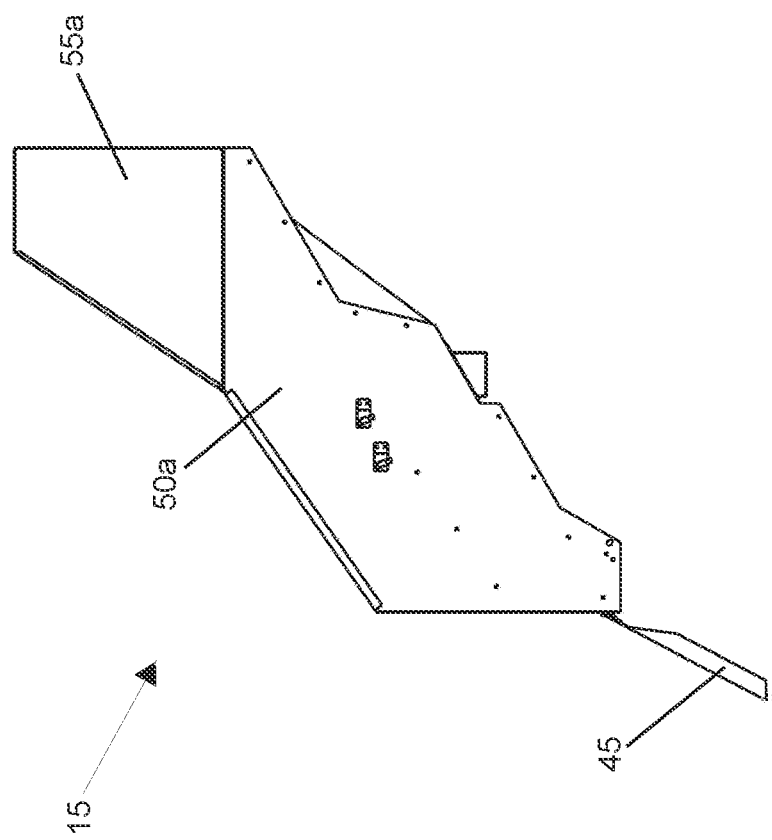

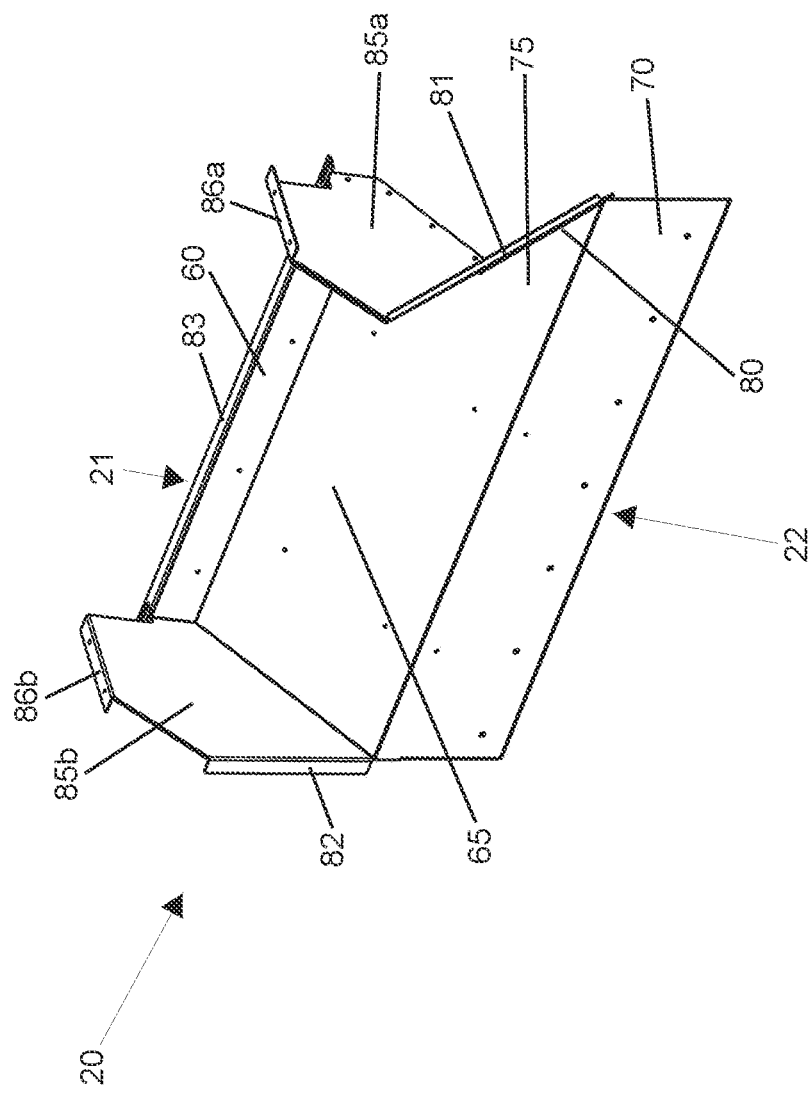

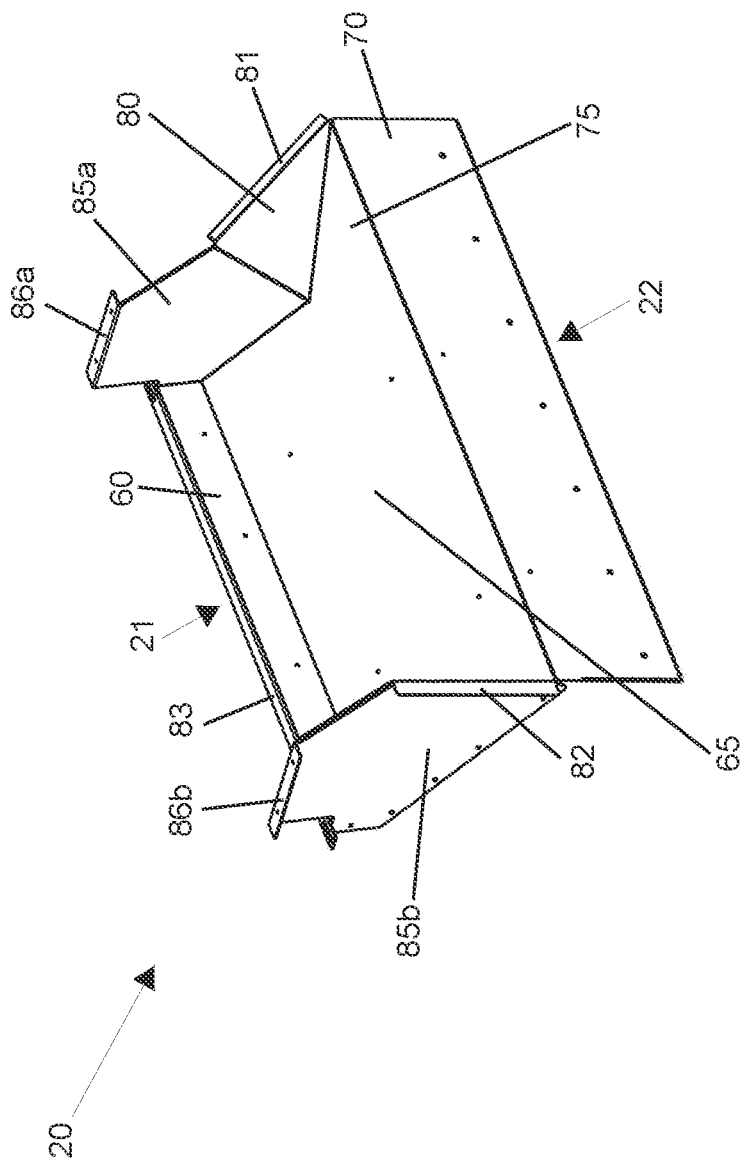

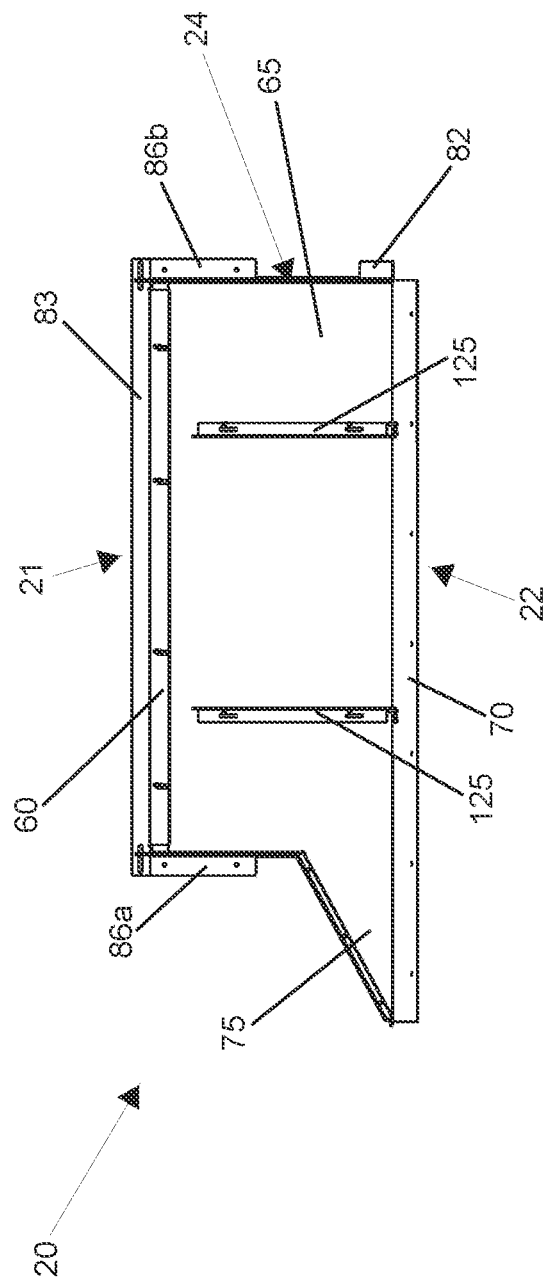

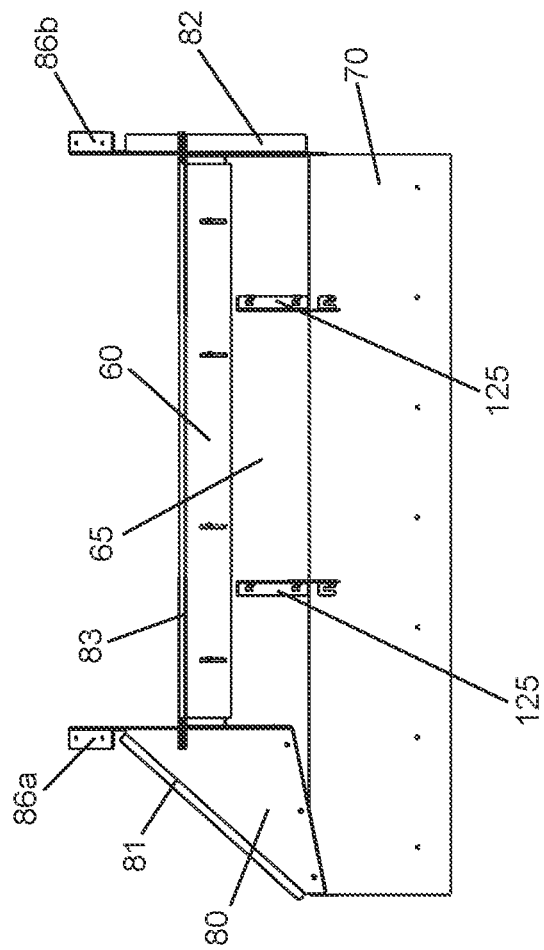

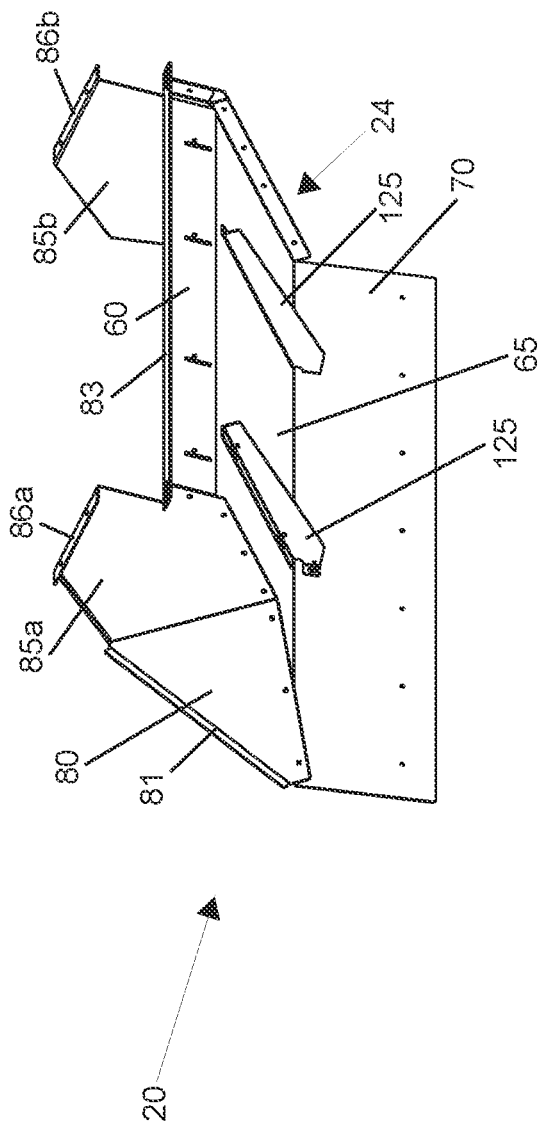

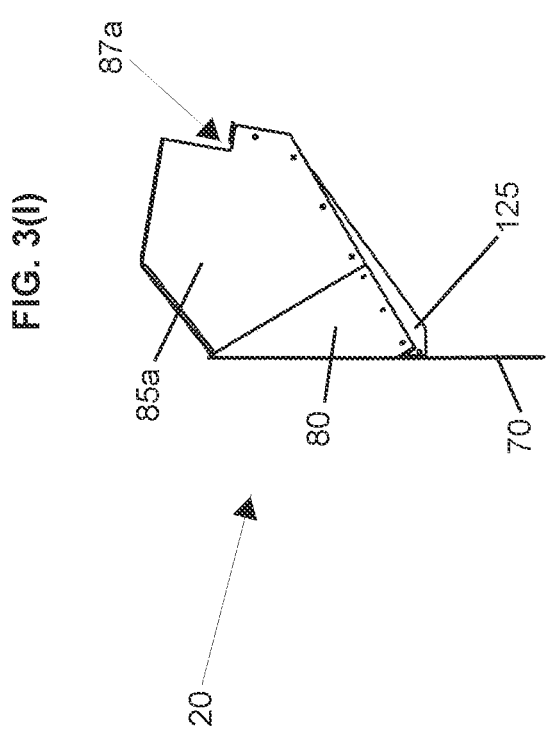

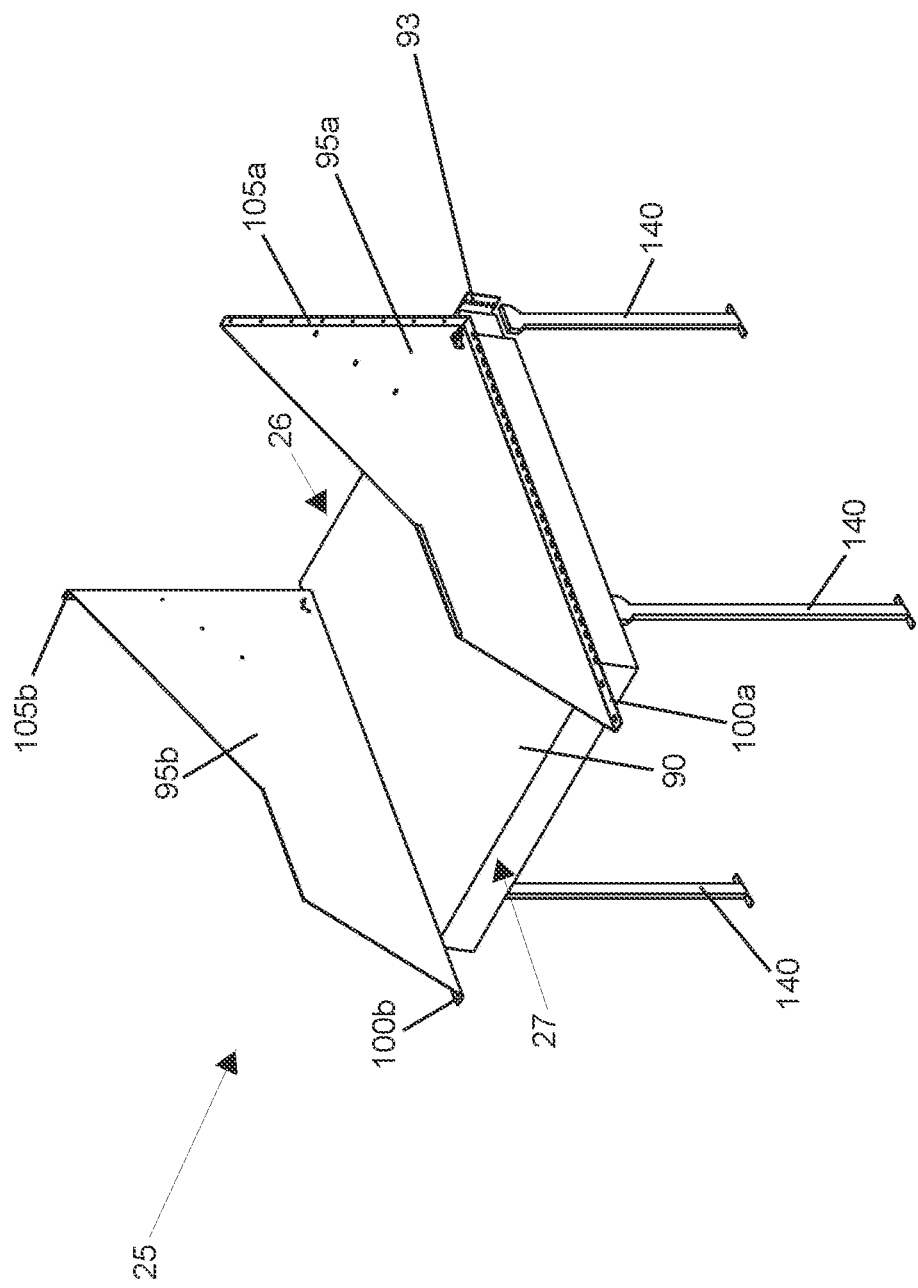

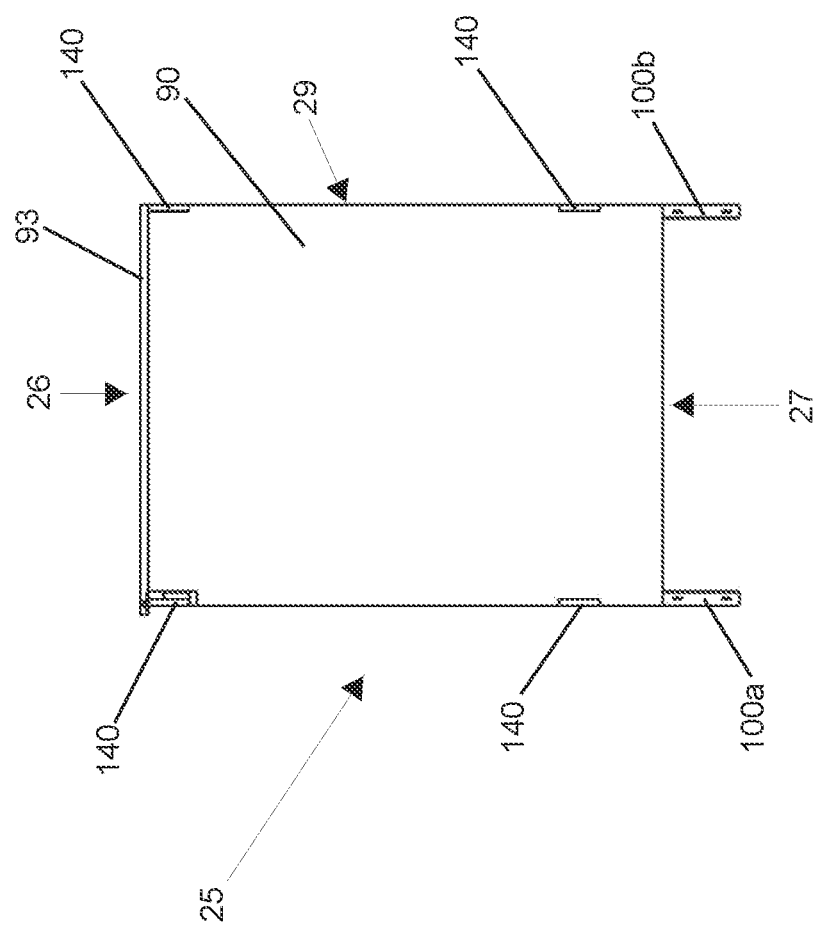

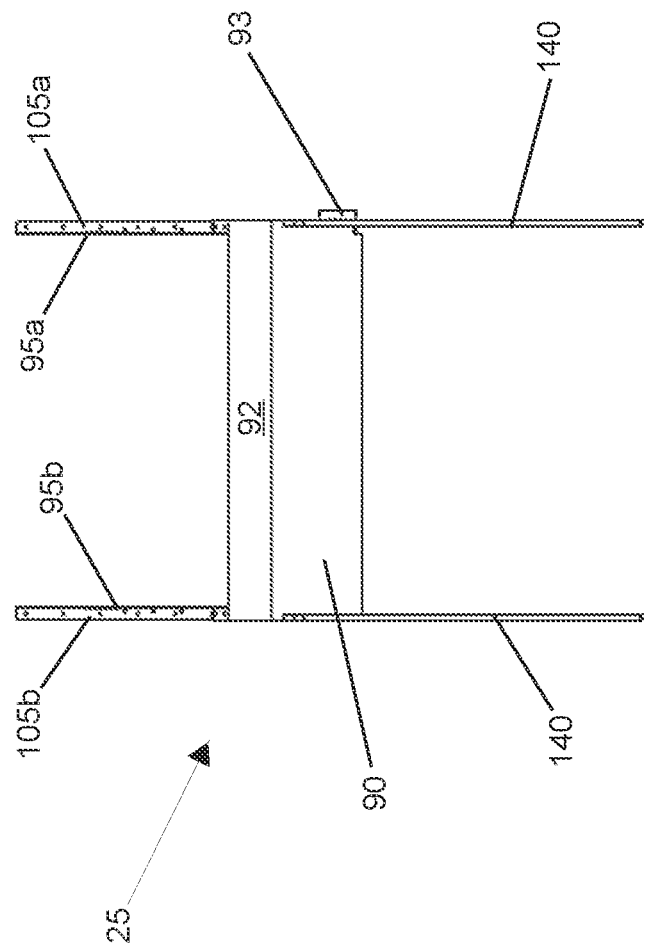

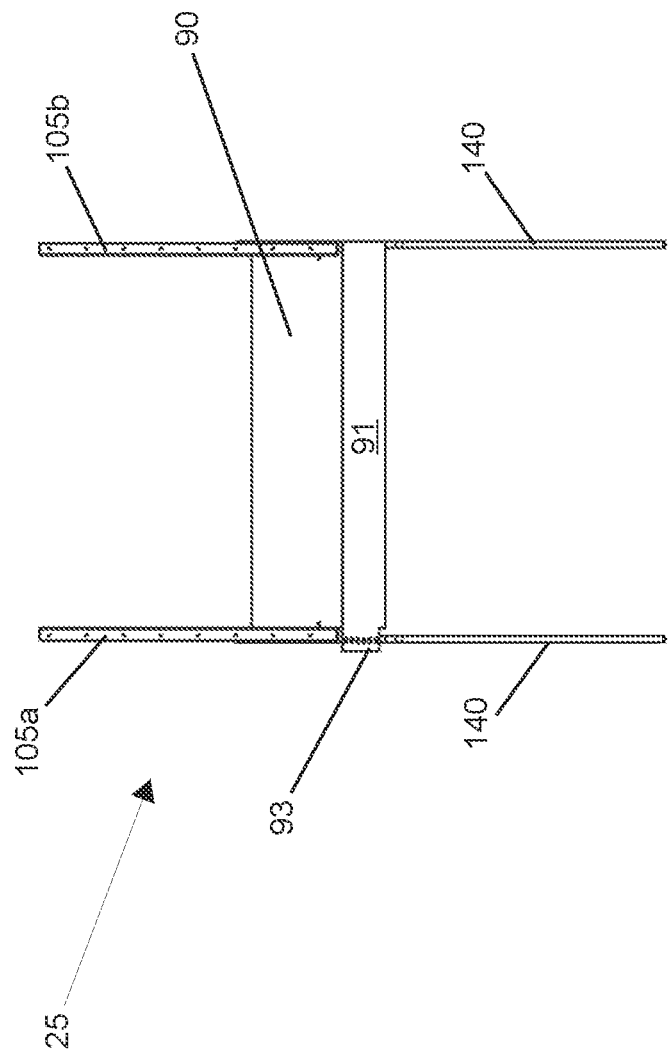

STEPPED ACCUMULATION CHUTE

BACKGROUND

Technical Field

The embodiments herein generally relate to mail sorting equipment and systems, and more particularly to slides or chutes for transferring and transporting parcels such as mail, envelopes, and packages in mail sorting systems.

Description of the Related Art

By nature of the mail sorting, loading, and unloading process, mail from an unloading station is typically deposited onto conveyors in sporadic batches. As batches of mail are transported along a series of conveyors with increasing belt speeds, the batches of mail are spread thin across the conveyor belts. This thin distribution of mail parcels, combined with the sporadic batch input from the unloading station, generally results in an overall low density of mail along the series of conveyors. For optimal performance, the mail sorting system should be supplied with a high density of mail for maximum throughput. High-density mail has two attributes. First, high-density mail is compact. Compact mail contains no gaps or spaces between parcels of mail. Second, high-density mail contains multiple layers of mail parcels piled on top of each other. Conventional mail sorting systems typically utilize elongated slides containing large vertical drops. However, large vertical drops can damage parcels. Straight slides typically do not provide enough accumulation because the mail is only single level. Moreover, straight slides generally apply too much pressure and cannot control the release of the parcels.

SUMMARY

In view of the foregoing, an embodiment herein provides an apparatus comprising an upper stepped chute comprising a substantially downward sloped configuration; a lower stepped chute comprising a substantially downward sloped configuration; and an intermediate conveyor section separating the upper stepped chute from the lower stepped chute, wherein the intermediate conveyor section comprises a slope that is different from the slope of the upper stepped chute and the lower stepped chute.

The upper stepped chute may comprise a first upper section arranged in a downwardly inclined configuration; a first upper stepped section downwardly extending from the first upper section; a second upper section downwardly extending from the first upper stepped section; and a second upper stepped section downwardly extending from the second upper section. The second upper stepped section may be adjacent to the intermediate conveyor section. The upper stepped chute may comprise a pair of first upper chute sidewalls upwardly extending from the first upper section, the first upper stepped section, and the second upper section; and a pair of second upper chute sidewalls upwardly extending from the pair of first upper chute sidewalls. The lower stepped chute may comprise a first lower stepped section arranged in a downwardly inclined configuration extending from the intermediate conveyor section; a lower slide section downwardly extending from the first lower stepped section; and a second lower stepped section downwardly extending from the lower slide section.

The lower stepped chute may comprise a flared bottom portion connected to the second lower stepped section; and an angled sidewall extending from the flared bottom portion. The lower stepped chute may comprise a first lower chute sidewall upwardly extending from the lower slide section; and a second lower chute sidewall upwardly extending from the lower slide section, wherein the angled sidewall connects to the first lower chute sidewall, and wherein the angled sidewall is angled with respect to the first lower chute sidewall. The intermediate conveyor section may comprise a conveyor belt base; a pair of conveyor sidewalls upwardly extending from the conveyor belt base; a pair of perforated ribs connected to the pair of conveyor sidewalls; and a pair of guide sidewalls connected to the pair of conveyor sidewalls, wherein the pair of conveyor sidewalls connect to the first lower chute sidewall, the second lower chute sidewall, and the pair of first upper chute sidewalls.

The conveyor belt base of the intermediate conveyor section may be configured to accommodate a conveyor belt. The apparatus may comprise at least one sidewall stiffener member connecting and supporting the pair of first upper chute sidewalls to the pair of conveyor sidewalls. The slope of the intermediate conveyor section may comprise an approximately 10° incline or decline from the upper stepped chute towards the lower stepped chute. The apparatus may comprise at least one upper stepped chute stiffener member connecting and supporting the first upper section to the first upper stepped section of the upper stepped chute. The apparatus may comprise at least one lower stepped chute stiffener member connecting and supporting the lower slide section to the second lower stepped section of the lower stepped chute.

The apparatus may comprise at least one upper chute supporting leg mechanically supporting a weight of the upper stepped chute. The apparatus may comprise at least one lower chute supporting leg mechanically supporting a weight of the lower stepped chute. The apparatus may comprise at least one conveyor support leg mechanically supporting a weight of the intermediate conveyor section. The second upper section and the second upper stepped section may be pivotally connected to each other.

Another embodiment provides a system comprising an upper stepped chute comprising a substantially downward sloped configuration, wherein the upper stepped chute comprises an open first upper end and an open second upper end; a lower stepped chute comprising a substantially downward sloped configuration, wherein the lower stepped chute comprises an open first lower end and an open second lower end; and an intermediate conveyor section comprising an open first conveyor end and an open second conveyor end, wherein the open first conveyor end is adjacent to the open second upper end of the upper stepped chute, wherein the open second conveyor end is adjacent to the open first lower end of the lower stepped chute, and wherein the intermediate conveyor section upwardly inclines or declines from the open first conveyor end towards the open second conveyor end. The system may comprise a package infeed conveyor adjacent to the open first upper end of the upper stepped chute. The system may comprise a mail sorter adjacent to the open second lower end of the lower stepped chute.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1(D) is a schematic diagram illustrating a top view of the assembled apparatus of FIGS. 1(B) and 1(C), according to an embodiment herein;

FIG. 1(E) is a schematic diagram illustrating a bottom view of the assembled apparatus of FIGS. 1(B) and 1(C), according to an embodiment herein;

FIG. 1(F) is a schematic diagram illustrating a front view of the assembled apparatus of FIGS. 1(B) and 1(C), according to an embodiment herein;

FIG. 1(I) is a schematic diagram illustrating a left-side view of the assembled apparatus of FIGS. 1(B) and 1(C), according to an embodiment herein;

FIG. 1(J) is a schematic diagram illustrating a right-side view of the assembled apparatus of FIGS. 1(B) and 1(C), according to an embodiment herein;

FIG. 2(A) is a schematic diagram illustrating an elevated right-side perspective view of an upper stepped chute of the apparatus of FIGS. 1(A) through 1(J), according to an embodiment herein;

FIG. 2(C) is a schematic diagram illustrating a top view of the upper stepped chute of FIGS. 2(A) and 2(B), according to an embodiment herein;

FIG. 2(D) is a schematic diagram illustrating a bottom view of the upper stepped chute of FIGS. 2(A) and 2(B), according to an embodiment herein;

FIG. 2(F) is a schematic diagram illustrating a rear view of the upper stepped chute of FIGS. 2(A) and 2(B), according to an embodiment herein;

FIG. 2(G) is a schematic diagram illustrating a rear perspective view of the upper stepped chute of FIGS. 2(A) and 2(B), according to an embodiment herein;

FIG. 2(I) is a schematic diagram illustrating a right-side view of the upper stepped chute of FIGS. 2(A) and 2(B), according to an embodiment herein;

FIG. 3(A) is a schematic diagram illustrating an elevated right-side perspective view of a lower stepped chute of the apparatus of FIGS. 1(A) through 1(J), according to an embodiment herein;

FIG. 3(B) is a schematic diagram illustrating an elevated left-side perspective view of a lower stepped chute of the apparatus of FIGS. 1(A) through 1(J), according to an embodiment herein;

FIG. 3(D) is a schematic diagram illustrating a bottom view of the lower stepped chute of FIGS. 3(A) and 3(B), according to an embodiment herein;

FIG. 3(F) is a schematic diagram illustrating a rear view of the lower stepped chute of FIGS. 3(A) and 3(B), according to an embodiment herein;

FIG. 3(G) is a schematic diagram illustrating a rear perspective view of the lower stepped chute of FIGS. 3(A) and 3(B), according to an embodiment herein;

FIG. 3(I) is a schematic diagram illustrating a right-side view of the lower stepped chute of FIGS. 3(A) and 3(B), according to an embodiment herein;

DETAILED DESCRIPTION

Figure 1A:
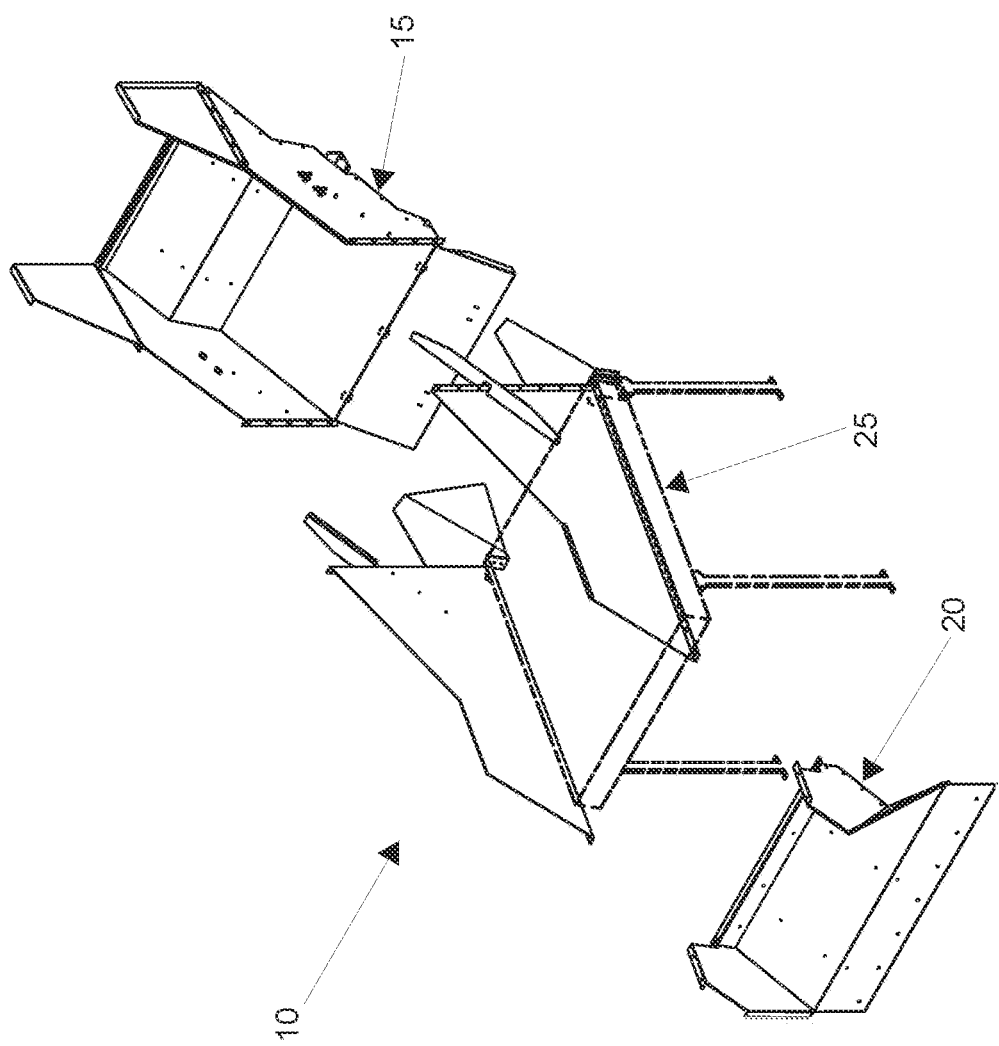
FIG. 1(A) is a schematic diagram illustrating an elevated perspective view of an unassembled apparatus, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an accumulation chute with a series of conveyors for transporting mail from a mail unloading station to a mail sorting system. The accumulation chute is provided to pile parcels for high-density throughput. The accumulation chute includes two stepped gravity chutes separated by an intermediary intermediate conveyor, wherein the stepped gravity chutes have a greater angle or slope compared to the intermediate conveyor. An upper stepped gravity chute accumulates incoming mail from a feeding conveyor. Parcel batches are then transported to a lower stepped gravity chute by the intermediate conveyor. Moreover, the accumulation chute achieves both attributes of the aforementioned high-density mail environment and maximizes accumulation, controls the flow to downstream mail handling operations, and minimizes mail damage. Additionally, the accumulation chute may be used in a mail and/or material/packaging handling environment such that the accumulation chute can be used as part of a greater system of conveyors for transporting mail within a facility. The chute enhances the function of this system of conveyors, and greatly increases the throughput of mail/packages/parcels/materials in the transportation process. Referring now to the drawings, and more particularly to FIGS. 1(A) through 5(B), where similar reference characters denote corresponding features consistently throughout the figures, there are shown preferred embodiments. In the drawings, the size and relative sizes of components, layers, and regions, etc. may be exaggerated for clarity.

Figure 4B:
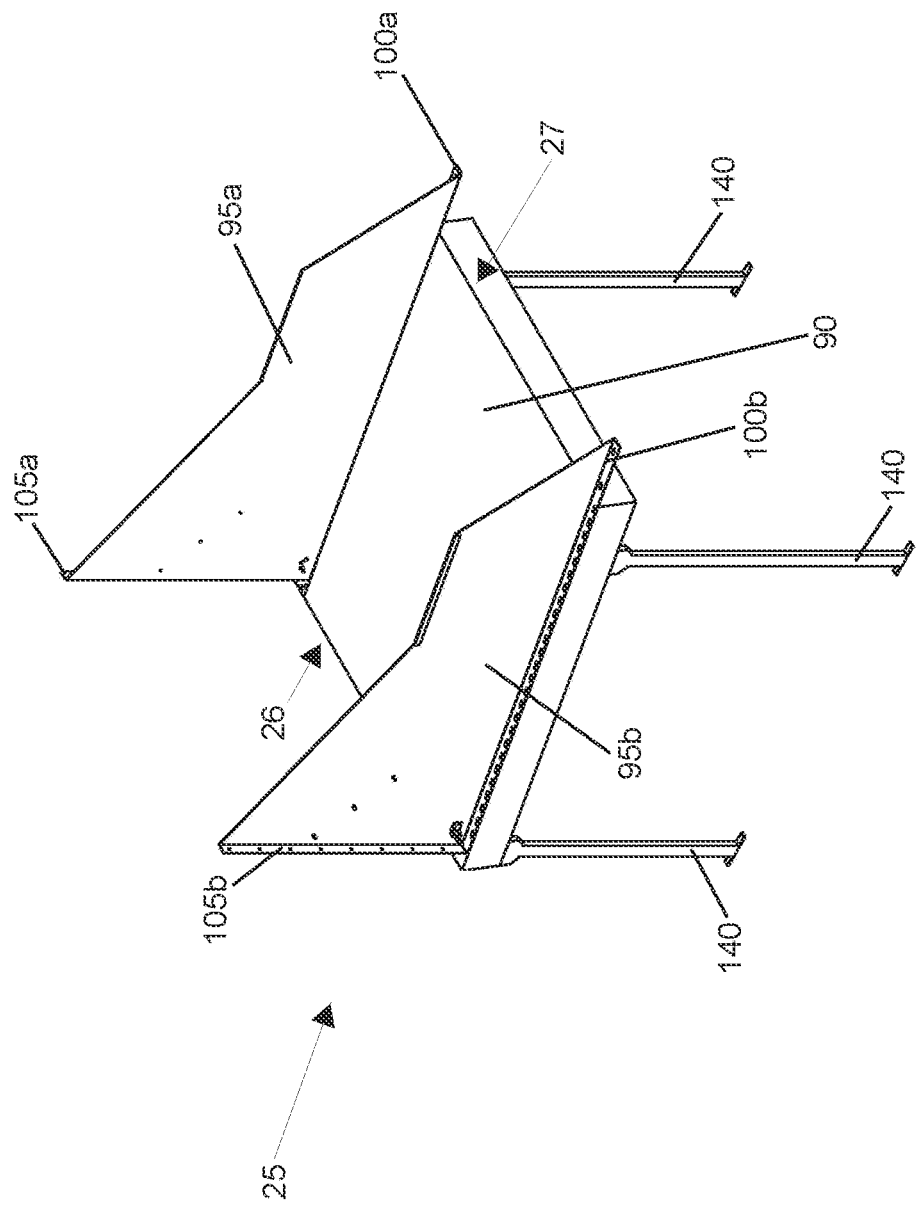
FIG. 4(B) is a schematic diagram illustrating an elevated left-side perspective view of an intermediate conveyor section of the apparatus of FIGS. 1(A) through 1(J), according to an embodiment herein.
Figure 4C:
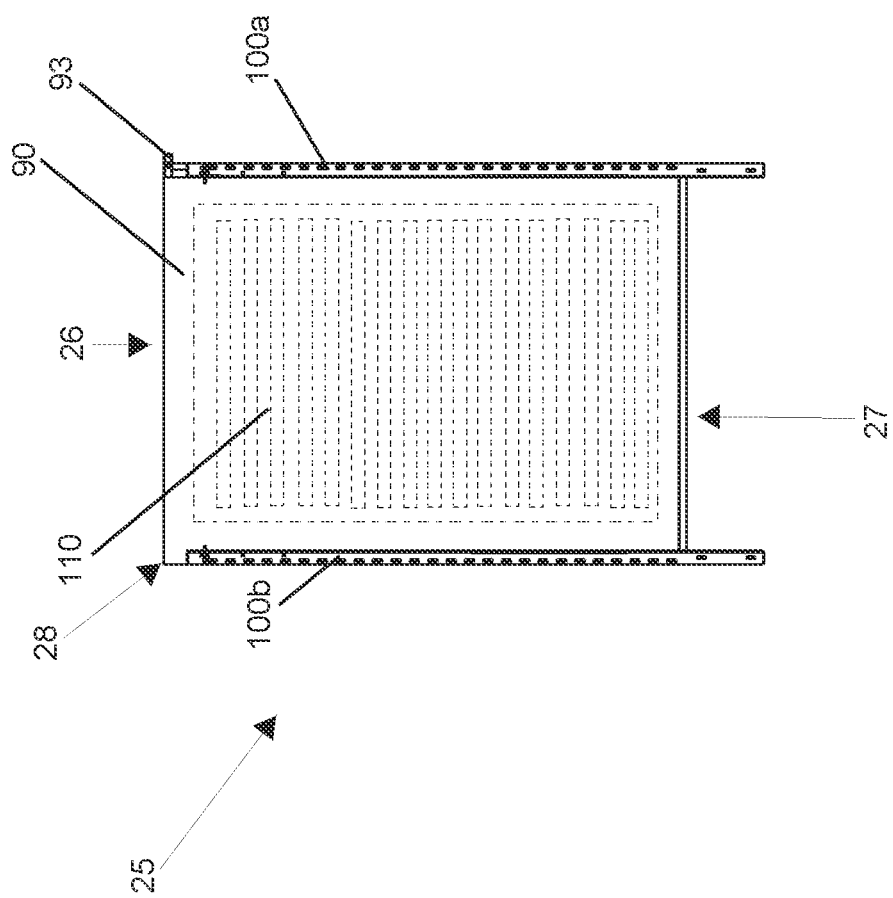
FIG. 4(C) is a schematic diagram illustrating a top view of the intermediate conveyor section of FIGS. 4(A) and 4(B) with a conveyor belt, according to an embodiment herein.
Figure 4G:
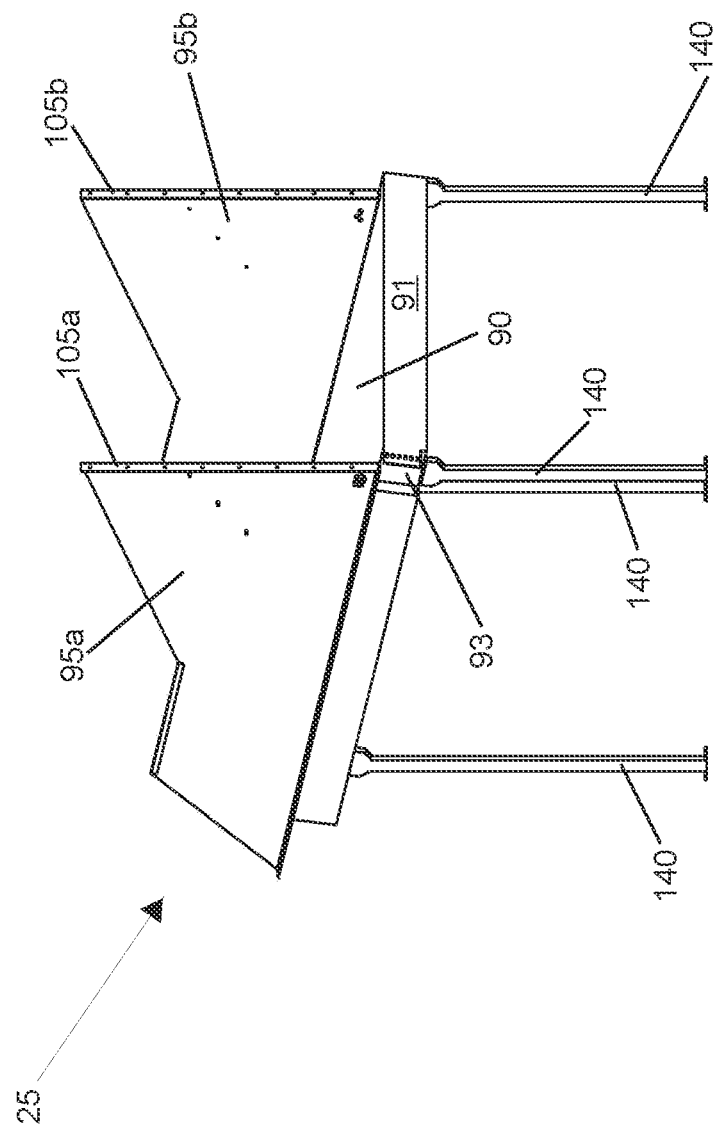
FIG. 4(G) is a schematic diagram illustrating a rear perspective view of the intermediate conveyor section of FIGS. 4(A) and 4(B), according to an embodiment herein.
Figure 4H:
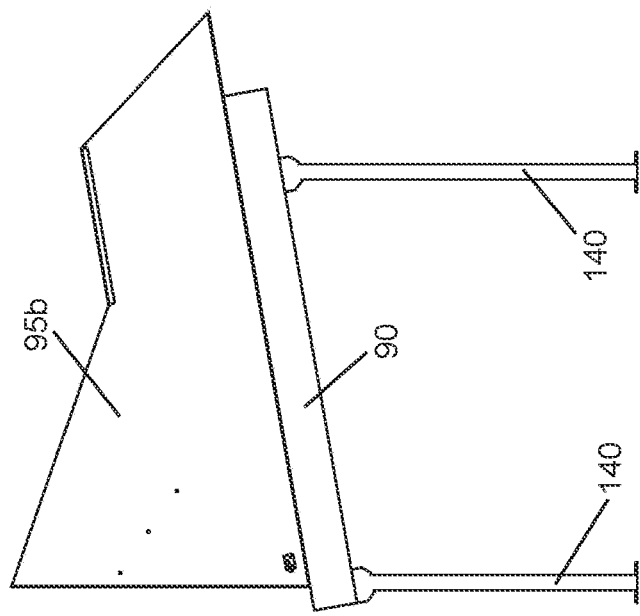
FIG. 4(H) is a schematic diagram illustrating a left-side view of the intermediate conveyor section of FIGS. 4(A) and 4(B), according to an embodiment herein.
Figure 4H:
Figure 4L:
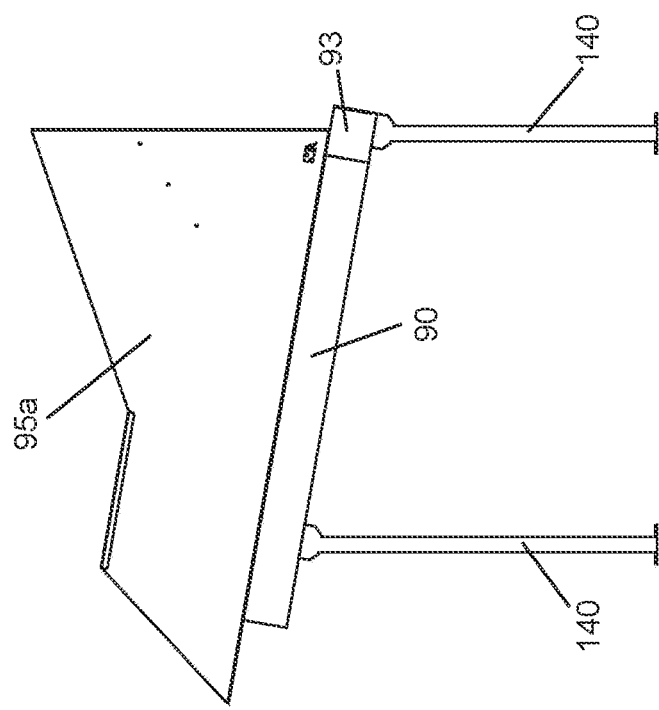
FIG. 4(A) is a schematic diagram illustrating an elevated right-side perspective view of an intermediate conveyor section of the apparatus of FIGS. 1(A) through 1(J), according to an embodiment herein.
FIG. 4(D) is a schematic diagram illustrating a bottom view of the intermediate conveyor section of FIGS. 4(A) and 4(B), according to an embodiment herein.
FIG. 4(E) is a schematic diagram illustrating a front view of the intermediate conveyor section of FIGS. 4(A) and 4(B), according to an embodiment herein.
FIG. 4(F) is a schematic diagram illustrating a rear view of the intermediate conveyor section of FIGS. 4(A) and 4(B), according to an embodiment herein.
FIG. 4(I) is a schematic diagram illustrating a right-side view of the intermediate conveyor section of FIGS. 4(A) and 4(B), according to an embodiment herein.
Figure 5A:
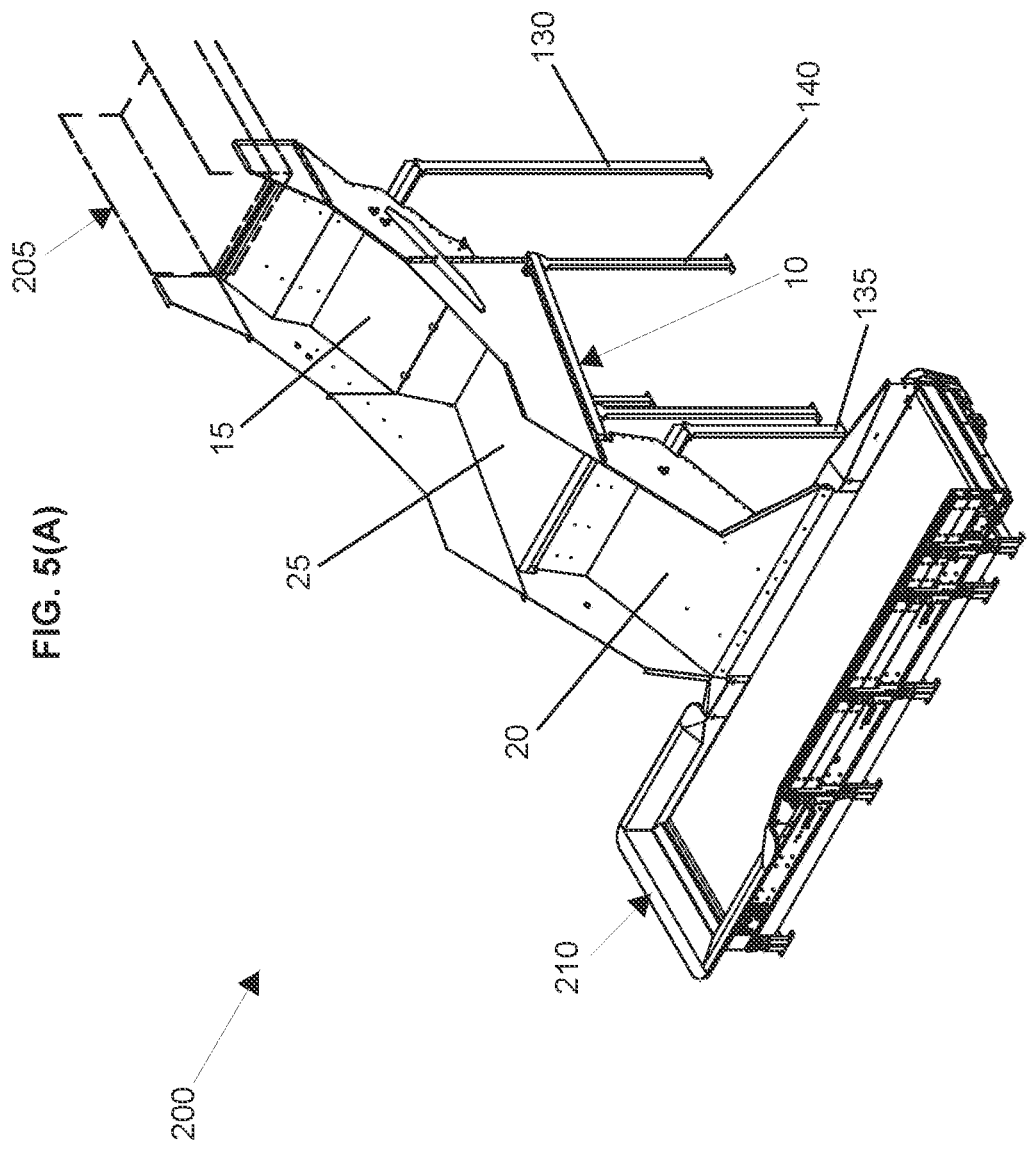
FIG. 5(A) is a schematic diagram illustrating an elevated perspective view of a system including the apparatus of FIGS. 1(B) and 1(C), according to an embodiment herein.
Figure 5B:
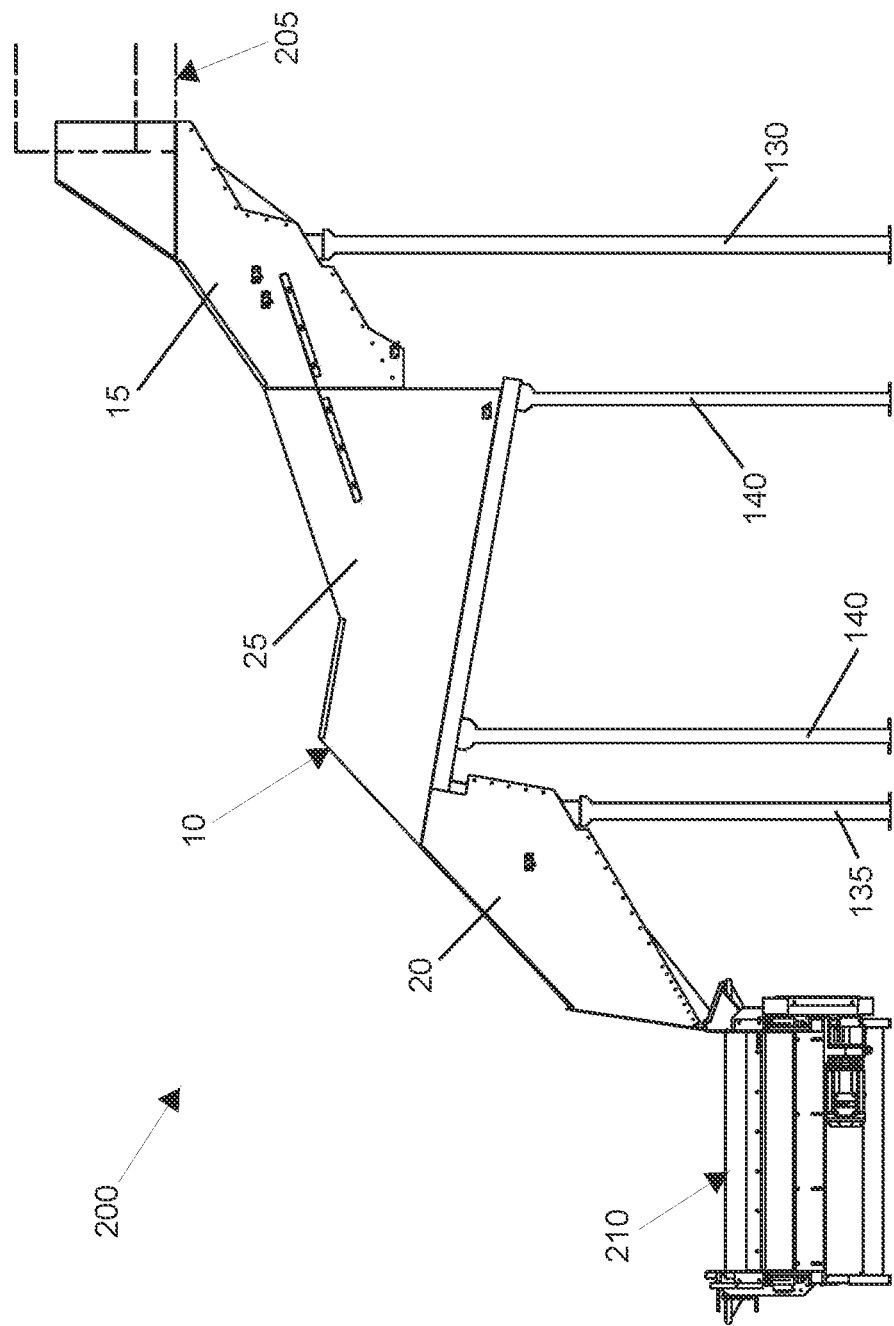
FIG. 5(B) is a schematic diagram illustrating a right-side view of the system of FIG. 5(A), according to an embodiment herein.

FIGS. 1(A) through 1(J) illustrate various views of an apparatus 10 configured as a parcel accumulation chute, and which can be used as part of an overall mail sorting system 200, which is further shown in FIGS. 5(A) and 5(B). The apparatus 10 is generally configured as a progressively downwardly sloping open chute or slide that is in a substantially linear alignment. In some examples, an intermediate portion of the apparatus 10 may be upwardly inclining or downwardly declining or may be flat without any incline/decline. The apparatus 10 may comprise multiple components, which may be individually manufactured and then assembled together for delivery to a user's location. Alternatively, the components may be assembled together at the user's location. The various components and sub-assemblies of the apparatus 10 may comprise any suitable material that is sufficiently mechanically strong to withhold the weight of several hundred pounds of parcel that may be loaded onto the apparatus 10 at any particular time. For example, the material may comprise metal including steel, aluminum, and composite metals and alloys, or combinations thereof. In other examples, the material may comprise wood and high-strength plastic such as fiber reinforced plastic, or combinations thereof. Accordingly, the material may comprise transparent, translucent, and opaque materials, or combinations thereof. Additionally, the various components or sub-assemblies of the apparatus 10 may be joined together using any suitable type of retaining or fastening member such as screws, bolts, pins, pegs, nails, rivets, hinges, straps, high-strength tape, adhesives, magnets, electrical switches or locks, or combinations thereof. Moreover, in an example, the various components or sub-assemblies of the apparatus 10 may be treated with a low-friction paint or coating to provide for enhanced sliding of parcels on the apparatus 10. Examples of such paints or coatings include tungsten disulfide, molybdenum disulfide, Teflon® (available from The Chemours Company FC, LLC, Delaware, USA), and Xylan® (available from PPG Industries Ohio, Inc., Ohio, USA), or combinations thereof. For representative purposes, in FIGS. 1(A) through 5(B), the various components and sub-assemblies are shown as being formed of sheet metal, which may contain metal stamping or other types of metal fasteners such as tabs, rivets, screws, or other types of joints. These are merely examples, and the embodiments herein are not restricted to these particular types of fasteners, or any fasteners depending on the type of material used to construct the apparatus 10.

The apparatus 10 may comprise multiple sub-assemblies including an upper stepped chute 15, a lower stepped chute 20, and an intermediary intermediate conveyor section 25, and which may be substantially linearly aligned with each other, according to an example. Other sub-assemblies may be included in the apparatus 10 and the above-listed sub-assemblies may be joined/combined together to reduce the number of sub-assemblies requiring full assembly into a completed apparatus, in accordance with various examples. The upper stepped chute 15 comprises a substantially downward sloped configuration and the lower stepped chute 20 also comprises a substantially downward sloped configuration. The intermediate conveyor section 25 separates the upper stepped chute 15 from the lower stepped chute 20, and the intermediate conveyor section 25 comprises a slope that is different from the slope of the upper stepped chute 15 and the lower stepped chute 20. In an example, the upper stepped chute 15 and the lower stepped chute 20 both slope in a downward configuration while the intermediate conveyor section 25 slopes in the opposite upward configuration compared to the upper stepped chute 15 and the lower stepped chute 20. In another example, the upper stepped chute 15 and the lower stepped chute 20 both slope in a downward configuration while the intermediate conveyor section 25 slopes at a different angle compared to the upper stepped chute 15 and the lower stepped chute 20. According to an example, the slope (i.e., the angle of the incline or decline) of the intermediate conveyor section 25 may be approximately 0°-25°, and the slope (i.e., the angle of the generally downward configuration) of each of the upper stepped chute 15 and the lower stepped chute 20 may be approximately 60°-80°. However, other angles and ranges are possible in accordance with the embodiments herein. Furthermore, the respective slopes of the upper stepped chute 15 and the lower stepped chute 20 may be substantially the same or may be different from each other.

FIG. 1(A) illustrates the unassembled apparatus 10. For clarity and ease of viewing of the configuration of the various components, in FIG. 1(A), portions of the intermediate conveyor section 25 are shown as transparent components. In FIG. 1(A), the relative positioning for assembly of the upper stepped chute 15 and the lower stepped chute 20 to the intermediate conveyor section 25 are shown. In FIG. 1(A), the legs of the intermediate conveyor section 25 are represented in dashed lines to indicate that the height of the supporting legs may be adjustable. The sizes, configurations, and shapes of the respective upper stepped chute 15, the lower stepped chute 20, and intermediate conveyor section 25 are not necessarily restricted to the depictions provided in the drawings, and accordingly the embodiments herein may include any suitable size, configuration, and shape for the various components and sub-assemblies. In FIGS. 1(B) through 1(J), the assembled apparatus 10 is depicted. While only supporting legs for the intermediate conveyor section 25 are shown in FIGS. 1(B) through 1(J), there may be supporting legs for the upper stepped chute 15 and the lower stepped chute 20, which are further depicted in FIGS. 5(A) and 5(B) and described below.

Figure 1B:
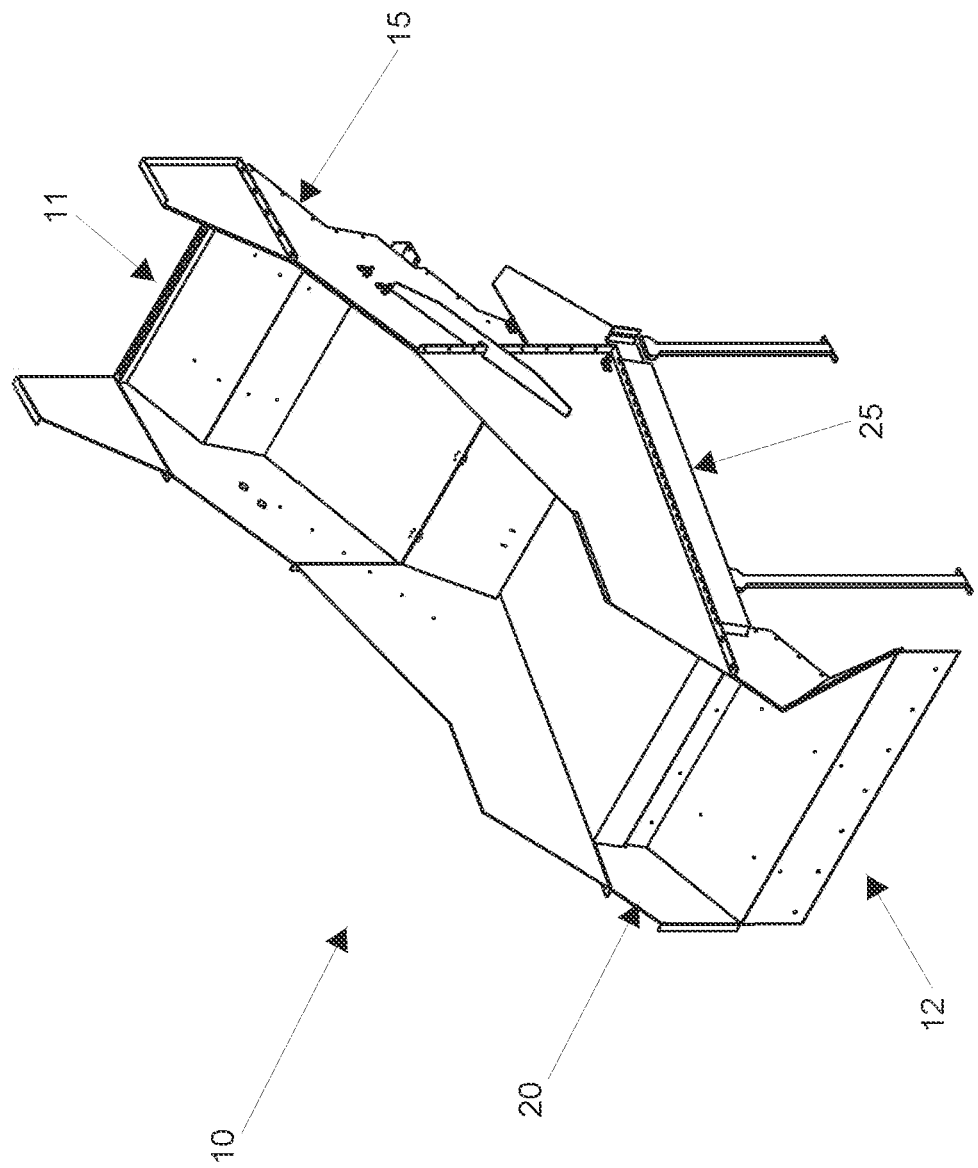
FIG. 1(B) is a schematic diagram illustrating an elevated right-side perspective view of an assembled apparatus, according to an embodiment herein.
Figure 1C:
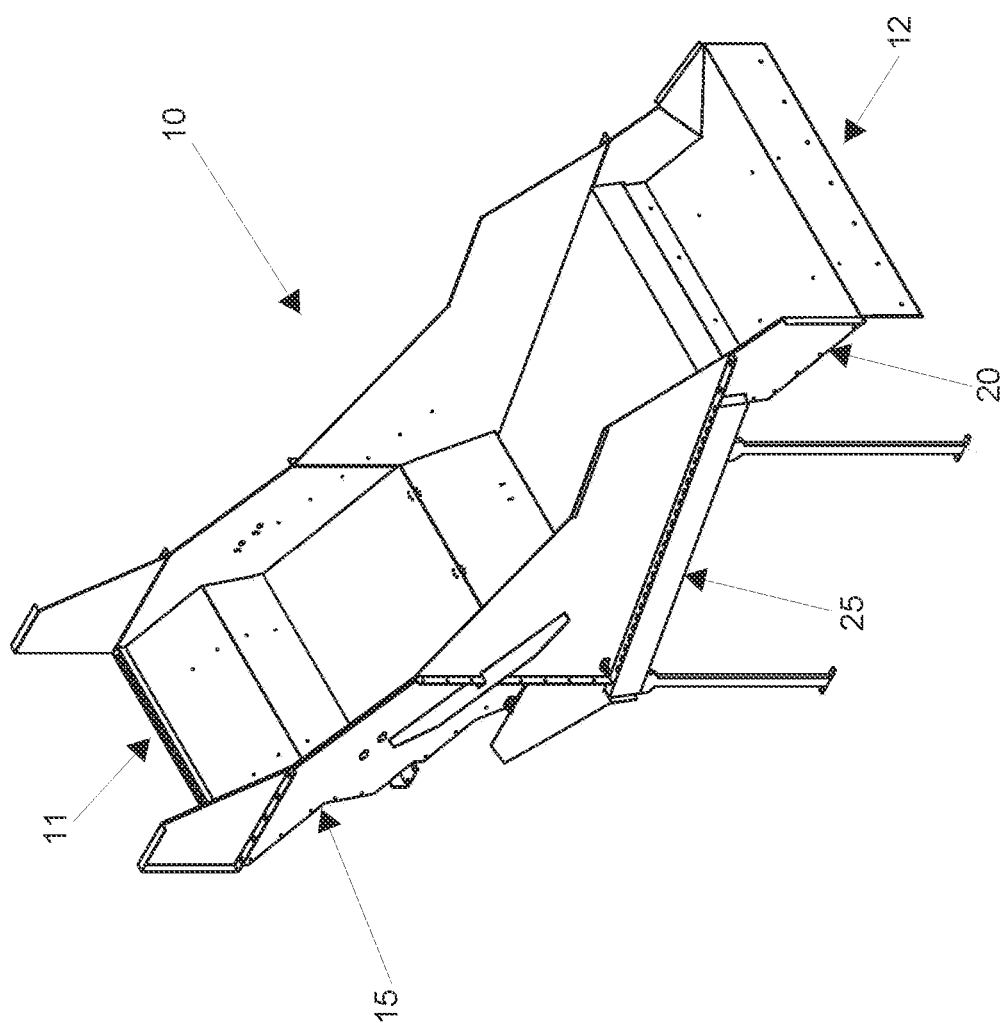
FIG. 1(C) is a schematic diagram illustrating an elevated left-side perspective view of an assembled apparatus, according to an embodiment herein.

Operationally, in FIGS. 1(B) and 1(C), a parcel (not shown) may be loaded or provided at the upper end 11 of the apparatus 10 and then the parcel slides down the upper stepped chute 15 and onto the intermediate conveyor section 25, where the parcel accumulates and is moved in a controlled manner using a conveyor belt system on the intermediate conveyor section 25. The parcel may move in an incline, decline, or in a substantially flat manner on the intermediate conveyor section 25, according to an example. Thereafter, the parcel is delivered onto the lower stepped chute 20 where it exits through the lower end 12 of the apparatus 10. The presence of the intermediate conveyor section 25 placed in-between the two stepped chutes (i.e., the upper stepped chute 15 and the lower stepped chute 20) allows for the continuous delivery of high-density batches of mail and parcels from an infeed conveyor (shown in FIGS. 5(A and 5(B))) to a mail sorting system (shown in FIGS. 5(A) and 5(B)). While one high-density batch of mail is delivered to the mail sorting system via the lower stepped chute 20, a second batch of mail is created in the upper stepped chute 15. Accordingly, batches of mail are transported from the upper stepped chute 15 to the lower stepped chute 20 via the intermediate conveyor section 25. The configuration and alignment of the various components and sub-assemblies in the apparatus 10 ensures a consistent and continuous high-density output of mail despite an inconsistent and sporadic low-density input of mail.

As shown in FIG. 1(D), the width $W_{15}$ of the upper stepped chute 15 and the width $W_{25}$ of the intermediate conveyor section 25 may be substantially similar. Moreover, an upper portion 13 of the lower stepped chute 20 may comprise a substantially similar width $W_{20}$ to respective widths $W_{15}$, $W_{20}$ of the upper stepped chute 15 and the intermediate conveyor section 25. The lower portion 14 of the lower stepped chute 20 may contain a generally flared-shaped configuration. However, more/less of the lower stepped chute 20, other than what is shown in the drawings, may be flared, and accordingly the embodiments herein are not restricted to a particular ratio of sizes. Additionally, while the figures depict that one side of the lower portion 14 of the lower stepped chute 20 being flared, in other examples, both sides of the lower portion 14 of the lower stepped chute 20 may be flared in accordance with the embodiments herein. Furthermore, the embodiments herein are not restricted to a particular dimension, size, or relative size for the respective widths $W_{15}$, $W_{20}$, $W_{25}$ of the upper stepped chute 15, lower stepped chute, and the intermediate conveyor section 25.

As shown in FIG. 1(E), the overall length $L_{10}$ of the apparatus 10 may be greater than the overall width $W_{10}$ of the apparatus 10. Additionally, the length $L_{20}$ of the lower stepped chute 20 may be less than the length $L_{15}$ of the upper stepped chute 15, which may be less than the length $L_{25}$ of the intermediate conveyor section 25. The overall shapes and configurations of the upper stepped chute 15, the lower stepped chute 20, and the intermediate conveyor section 25 may be substantially rectangular. However, other shapes and configurations are possible, and the embodiments herein are not restricted to a particular shape or configuration. Furthermore, the embodiments herein are not restricted to a particular dimension or size or relative size for the respective length and width $L_{10}$, $W_{10}$ of the apparatus 10 or the respective lengths $L_{15}$, $L_{20}$, $L_{25}$ of the upper stepped chute 15, lower stepped chute 20, and the intermediate conveyor section 25.

As shown in FIG. 1(F), the overall height $H_{10}$ of the apparatus 10 may be greater than the overall width $W_{10}$ of the apparatus 10. Additionally, the height $H_{25}$ of the intermediate conveyor section 25 may be less than the height $H_{20}$ of the lower stepped chute 20, which may be less than the height $H_{15}$ of the upper stepped chute 15. Additionally, the bottom edge 9 of the lower stepped chute 20 may be above the ground/floor/base with an offset height of $H_0$. Moreover, the embodiments herein are not restricted to a particular dimension or size or relative size for the respective height and width $H_{10}$, $W_{10}$ of the apparatus 10 or the respective heights $H_{15}$, $H_{20}$, $H_{25}$ of the upper stepped chute 15, lower stepped chute 20, and the intermediate conveyor section 25 or the offset height $H_0$ of the lower stepped chute 20 from the ground/floor/base.

Figure 1G:
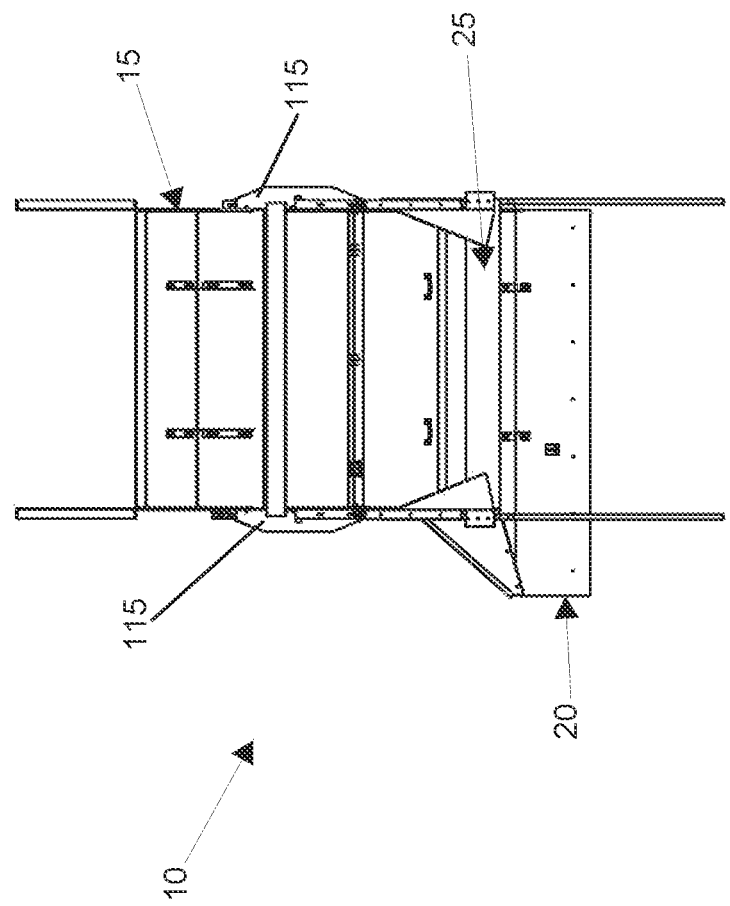
FIG. 1(G) is a schematic diagram illustrating a rear view of the assembled apparatus of FIGS. 1(B) and 1(C), according to an embodiment herein.
Figure 1H:
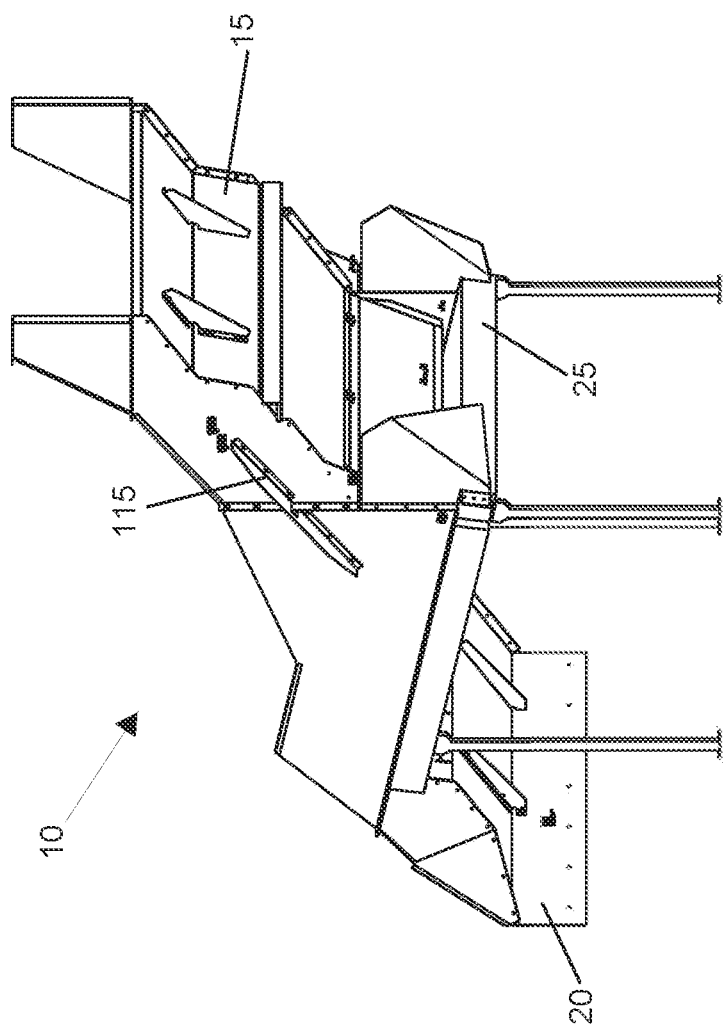
FIG. 1(H) is a schematic diagram illustrating a rear perspective view of the assembled apparatus of FIGS. 1(B) and 1(C), according to an embodiment herein.

As shown in FIGS. 1(G) and 1(H), the apparatus 10 comprises at least one sidewall stiffener member 115, which may provide a mechanical support to the upper stepped chute 10 and the intermediate conveyor section 25. Moreover, the at least one sidewall stiffener member 115 may provide at least one connection of the upper stepped chute 10 to the intermediate conveyor section 25. The at least one sidewall stiffener member 115 may comprise any suitable material, shape, and configuration and may be connected to the upper stepped chute 10 and the intermediate conveyor section 25 using any suitable retaining mechanism including the fastening and retaining mechanisms described above. Furthermore, the at least one sidewall stiffener member 115 may be positioned on the outside of the upper stepped chute 10 and the intermediate conveyor section 25 to not interrupt the flow of parcels down the upper stepped chute 10 and in the intermediate conveyor section 25.

As shown in FIGS. 1(I) and 1(J), the angle of the intermediate conveyor section 25 may be selected to be any suitable angle as required to provide an inclined configuration for the intermediate conveyor section 25. According to an example, the intermediate conveyor section 25 may comprise any suitable slope configuration relative to the ground; i.e., a flat (e.g., 0°), incline (e.g., greater than 0°), or a decline (e.g., less than 0°). More particularly, in an example, the intermediate conveyor section 25 comprises an approximately 10° incline from the upper stepped chute 10 towards the lower stepped chute 20. In another example, the intermediate conveyor section 25 comprises an approximately 10° decline from the upper stepped chute 10 towards the lower stepped chute 20. However, other angles are possible, and the embodiments herein are not restricted to a particular angle or range. Additionally, the intermediate conveyor section 25 may assume its inclined or declined shape in any suitable manner. For example, the intermediate conveyor section 25 may be a wedged shaped configuration to provide for the inclined or declined shape. In another example, the apparatus 10 comprises at least one conveyor support leg 140 mechanically supporting a weight of the intermediate conveyor section 25. There may be any suitable number of the at least one conveyor support leg 140. In an example, the at least one conveyor support leg 140 may have an adjustable height to permit raising/lowering of some of the legs 140a, 140b to provide for the incline or decline of the intermediate conveyor section 25. As such, the incline or decline of the intermediate conveyor section 25 may be variable based on the raising/lowering of the legs 140a, 140b. In another example, the height of the at least one conveyor support leg 140 is set such that the legs 140a, 140b may be positioned at set heights to provide for the incline or decline of the intermediate conveyor section 25. For example, the legs 140a closer to the upper stepped chute 15 may be at a lower height than the legs 140b closer to the lower stepped chute 20 to create the incline for the intermediate conveyor section 25. In another example, the legs 140a closer to the upper stepped chute 15 may be at a height height than the legs 140b closer to the lower stepped chute 20 to create the decline for the intermediate conveyor section 25. In still another example, the legs 140a closer to the upper stepped chute 15 may be at the same height as the legs 140b closer to the lower stepped chute 20 to create a flat configuration (i.e., no incline/decline) for the intermediate conveyor section 25.

As further shown in FIGS. 2(A) through 2(I), with reference to FIGS. 1(A) through 1(J), the upper stepped chute 15 comprises a substantially open configuration on the top side 18 of the upper stepped chute 15. The upper stepped chute 15 comprises a first upper section 30 arranged in a downwardly inclined configuration, a first upper stepped section 35 downwardly extending from the first upper section 30, a second upper section 40 downwardly extending from the first upper stepped section 35, and a second upper stepped section 45 downwardly extending from the second upper section 40. The relative angles of the first upper section 30, the first upper stepped section 35, the second upper section 40, and the second upper stepped section 45 may be selected to be at any suitable angle to provide for the overall downwardly inclined configuration of the upper stepped chute 15. In an example, the relative angle of the first upper section 30 and the second upper section 40 may be approximately the same. In an example, the relative angle of the first upper stepped section 35 and the second upper stepped section 45 may be approximately the same. However, the embodiments herein are not restricted to a particular angle or relative angle of the respective components.

According to an example, the second upper section 40 and the second upper stepped section 45 are pivotally connected to each other, which permits the angle of the second upper stepped section 45 to be variable. For example, the second upper section 40 and the second upper stepped section 45 may be operatively connected together by at least one hinge to provide for the pivoting movement. According to another example, the first upper section 30, first upper stepped section 35, and the second upper section 40 may be rigidly connected to each other. In an example, the first upper section 30, the first upper stepped section 35, and the second upper section 40 may be a continuous structure that is bent and shaped to provide the configuration of the respective first upper section 30, first upper stepped section 35, and second upper section 40. Moreover, once the apparatus 10 is assembled, the second upper stepped section 45 is positioned to be linearly aligned and adjacent to the intermediate conveyor section 25.

Figure 2B:
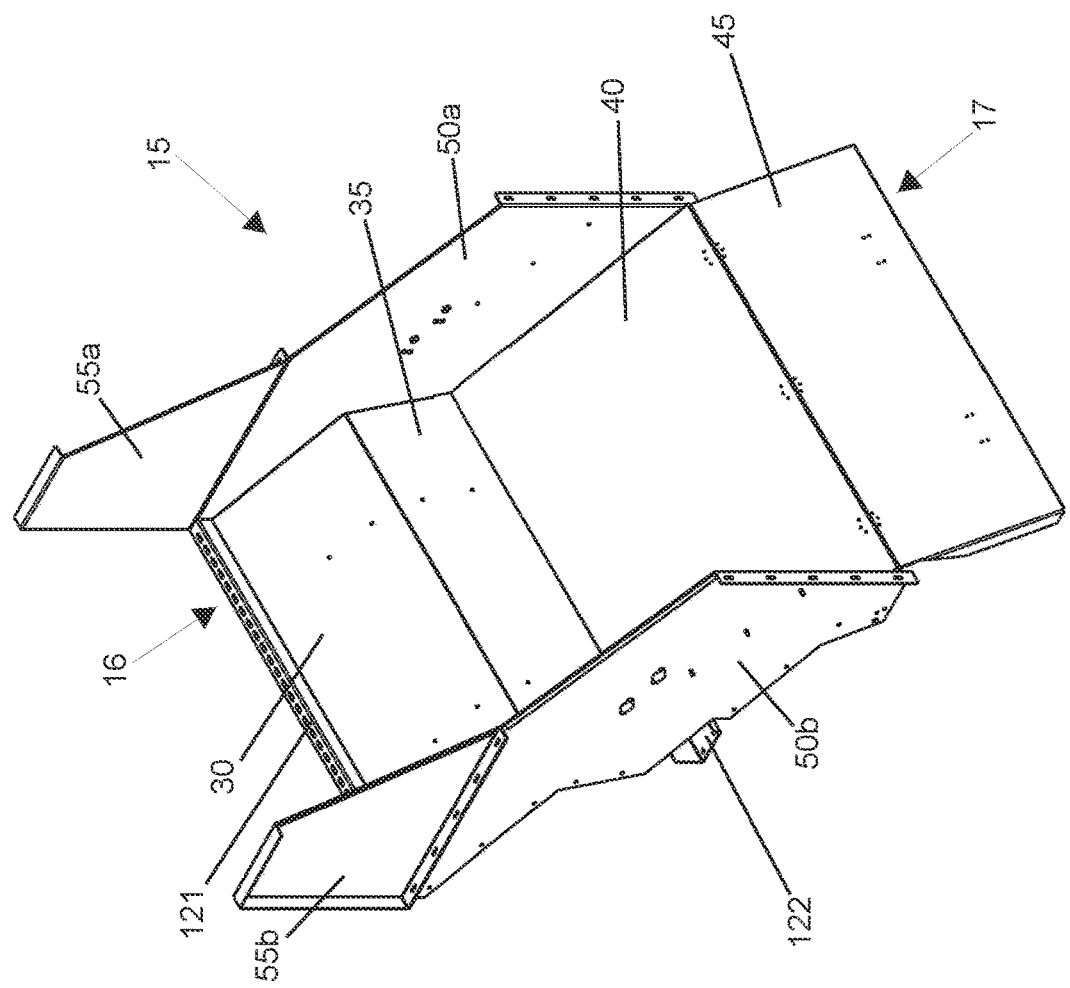
FIG. 2(B) is a schematic diagram illustrating an elevated left-side perspective view of an upper stepped chute of the apparatus of FIGS. 1(A) through 1(J), according to an embodiment herein.

As shown in FIGS. 2(A) and 2(B), the upper stepped chute 15 further comprises a pair of first upper chute sidewalls 50a, 50b upwardly extending from the first upper section 30, the first upper stepped section 35, and the second upper section 40. Moreover, the upper stepped chute 15 further comprises a pair of second upper chute sidewalls 55a, 55b upwardly extending from the pair of first upper chute sidewalls 50a, 50b. The pair of first upper chute sidewalls 50a, 50b and the pair of second upper chute sidewalls 55a, 55b may be configured to have a sufficient height to constrain parcels that are placed in the upper stepped chute 15. Accordingly, the pair of first upper chute sidewalls 50a, 50b and the pair of second upper chute sidewalls 55a, 55b may comprise any suitable size, shape, and configuration. The upper stepped chute 15 comprises an open first upper end 16 and an open second upper end 17. The open first upper end 16 may coincide with the upper end 11 of the apparatus 10. The upper stepped chute 15 also comprises a perforated lip 121 connected to the first upper section 30 and extending between the pair of upper chute sidewalls 50a, 50b and the pair of second upper chute sidewalls 55a, 55b at the first upper end 16.

Figure 2E:
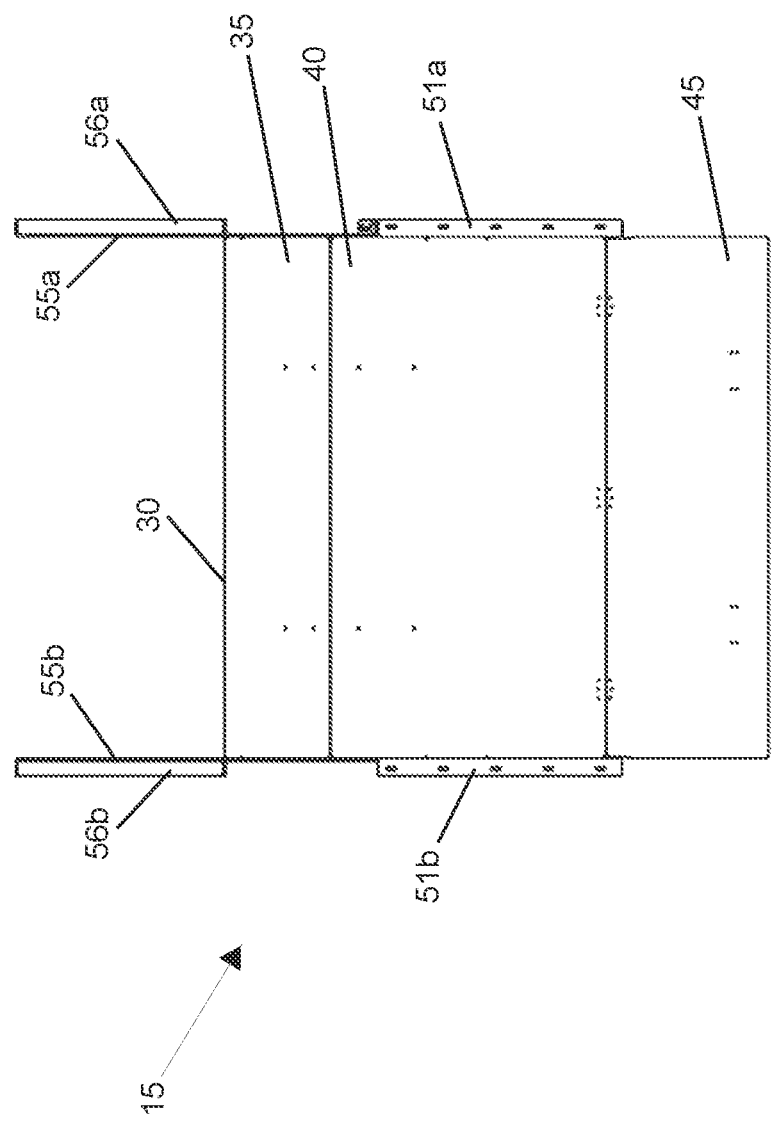
FIG. 2(E) is a schematic diagram illustrating a front view of the upper stepped chute of FIGS. 2(A) and 2(B), according to an embodiment herein.

As shown in FIGS. 2(C) and 2(D), the pair of second upper chute sidewalls 55a, 55b each comprise a rib 56a, 56b, respectively, partially arranged around at least one side and a top of the pair of second upper chute sidewalls 55a, 55b. Moreover, the pair of second upper chute sidewalls 55a, 55b each comprise a perforated rib 57a, 57b arranged on a bottom of the pair of second upper chute sidewalls 55a, 55b and at a junction of the connection between the pair of upper chute sidewalls 50a, 50b and the pair of second upper chute sidewalls 55a, 55b. As shown in FIGS. 2(E) and 2(F), the upper stepped chute 15 comprises a pair of perforated front walls 51a, 51b, which are positioned on the front ends of the respective pair of upper chute sidewalls 50a, 50b.

Figure 2H:
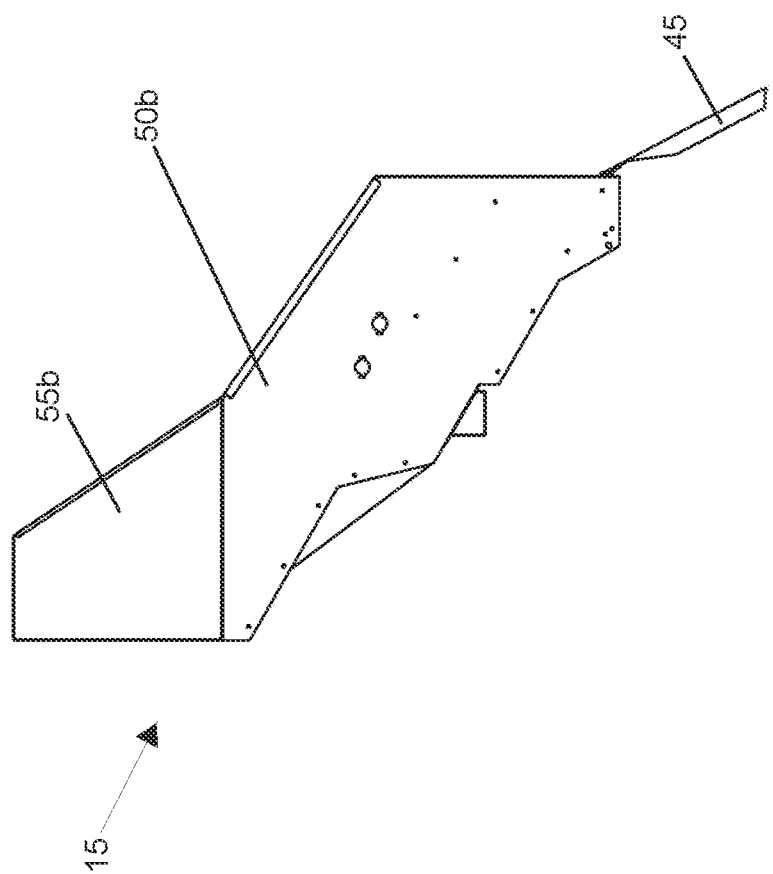
FIG. 2(H) is a schematic diagram illustrating a left-side view of the upper stepped chute of FIGS. 2(A) and 2(B), according to an embodiment herein.
Figure 3C:
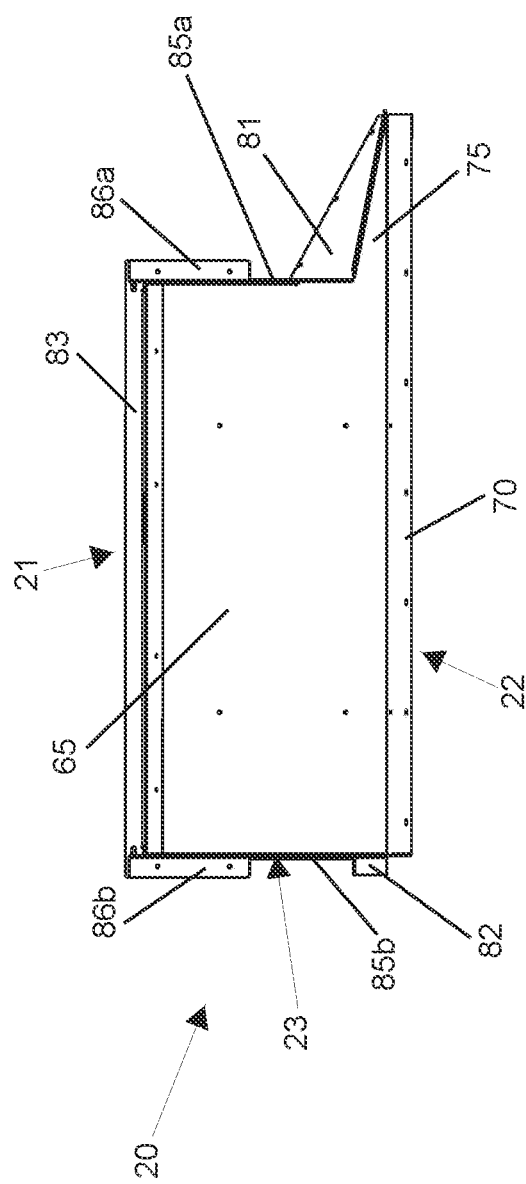
FIG. 3(C) is a schematic diagram illustrating a top view of the lower stepped chute of FIGS. 3(A) and 3(B), according to an embodiment herein.
Figure 3E:
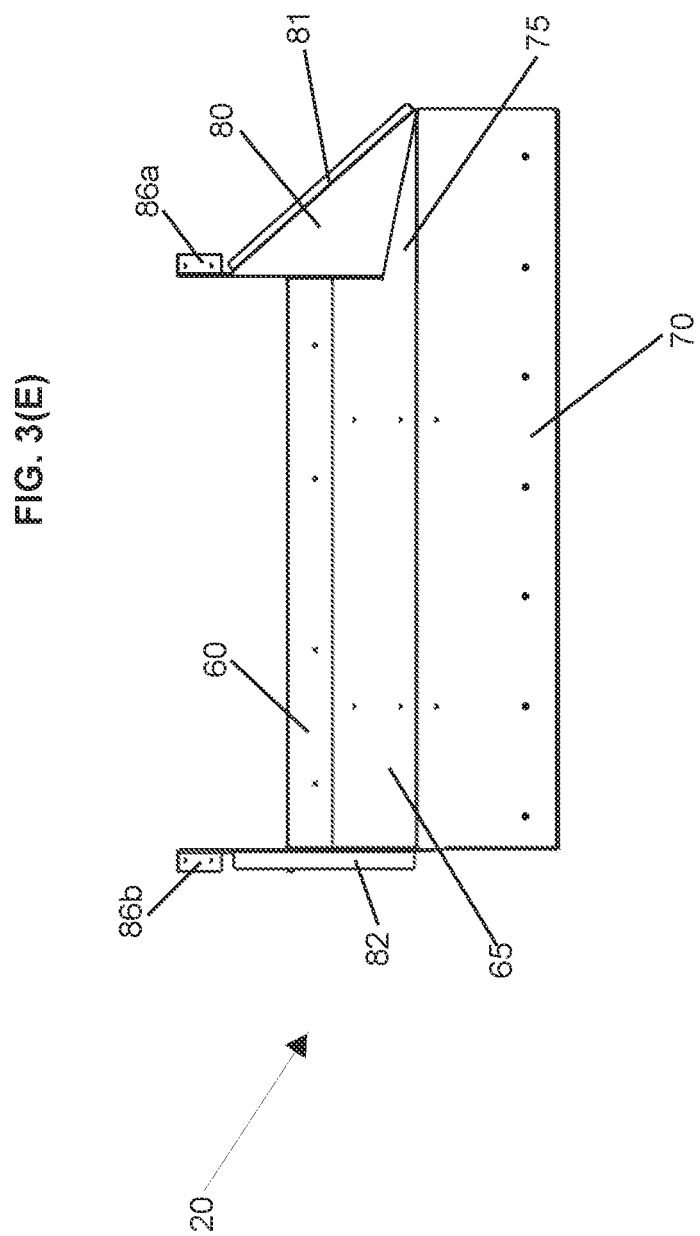
FIG. 3(E) is a schematic diagram illustrating a front view of the lower stepped chute of FIGS. 3(A) and 3(B), according to an embodiment herein.
Figure 3H:
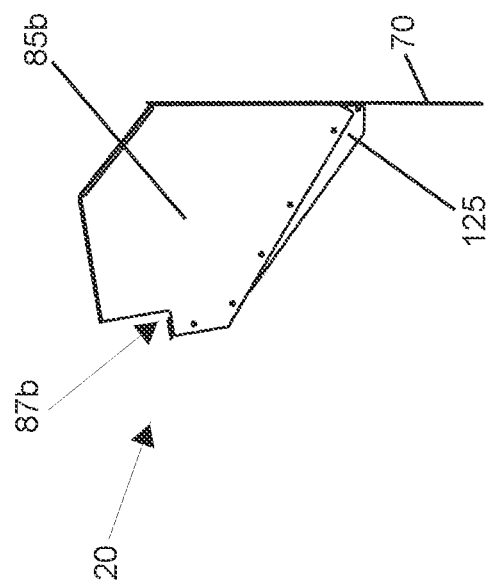
FIG. 3(H) is a schematic diagram illustrating a left-side view of the lower stepped chute of FIGS. 3(A) and 3(B), according to an embodiment herein.

As shown in FIGS. 2(D), 2(F), and 2(G), the upper stepped chute 15 comprises at least one upper stepped chute stiffener member 120 connecting the first upper section 30 to the first upper stepped section 35 of the upper stepped chute 15. Moreover, the at least one upper stepped chute stiffener member 120 provides mechanical support to the first upper section 30 and the first upper stepped section 35 of the upper stepped chute 15. The upper stepped chute 15 further includes a crossbar 122 connecting the pair of second upper chute sidewalls 55a, 55b on the bottom side 19 of the upper stepped chute 15. The at least one upper stepped chute stiffener member 120 may comprise any suitable material, shape, and configuration and may be connected to the first upper section 30 and the first upper stepped section 35 using any suitable retaining mechanism including the fastening and retaining mechanisms described above. As shown in FIGS. 2(H) and 2(I), the pair of upper chute sidewalls 50a, 50b are larger than the pair of second upper chute sidewalls 55a, 55b. However, other configurations and relative sizes of the corresponding components are possible, and the embodiments herein are not restricted to a particular size.

As further shown in FIGS. 3(A) through 3(I), with reference to FIGS. 1(A) through 2(I), the lower stepped chute 20 comprises a substantially open configuration on the top side 23 of the lower stepped chute 20. The lower stepped chute 20 comprises a first lower stepped section 60 arranged in a downwardly inclined configuration extending from the intermediate conveyor section 25, a lower slide section 65 downwardly extending from the first lower stepped section 60, and a second lower stepped section 70 downwardly extending from the lower slide section 65. The lower stepped chute 20 comprises an open first lower end 21 and an open second lower end 22. Moreover, the lower stepped chute 20 comprises a substantially open top side 23 and a substantially open bottom side 24. The relative angles of the first lower stepped section 60, the lower slide section 65, and the second lower stepped section 70 may be selected to be at any suitable angle to provide for the overall downwardly inclined configuration of the lower stepped chute 20. In an example, the relative angle of the first lower stepped section 60 and the second lower stepped section 70 may be approximately the same. However, the embodiments herein are not restricted to a particular angle or relative angle of the respective components.

According to an example, the first lower stepped section 60, the lower slide section 65, and the second lower stepped section 70 may be rigidly connected to each other. In an example, the first lower stepped section 60, the lower slide section 65, and the second lower stepped section 70 may be a continuous structure that is bent and shaped to provide the configuration of the respective first lower stepped section 60, the lower slide section 65, and the second lower stepped section 70. Moreover, once the apparatus 10 is assembled, the first lower stepped section 60 is positioned to be linearly aligned and adjacent to the intermediate conveyor section 25.

The lower stepped chute 20 comprises a flared bottom portion 75 connected to the second lower stepped section 70, and an angled sidewall 80 extending from the flared bottom portion 75. Moreover, the lower stepped chute 20 comprises a first lower chute sidewall 85a upwardly extending from the lower slide section 65, and a second lower chute sidewall 85b upwardly extending from the lower slide section 65. The angled sidewall 80 connects to the first lower chute sidewall 85a. Moreover, the angled sidewall 80 is angled with respect to the first lower chute sidewall 85a. The first lower chute sidewall 85a, the second lower chute sidewall 85b, and the angled sidewall 80 may comprise any suitable size, shape, and configuration. The first lower chute sidewall 85a, the second lower chute sidewall 85b, and the angled sidewall 80 may be configured to have a sufficient height to constrain parcels that are placed in the lower stepped chute 20. Additionally, the angle of the angled sidewall 80 may be any suitable angle. In an example, the angle of the angled sidewall 80 may be approximately 45° relative to the first lower chute sidewall 85a, although other angles are possible.

The first lower chute sidewall 85a may comprise an angled sidewall upper rib 81, an upper rib 86a, and a notch 87a. The second lower chute sidewall 85b may comprise a front rib 82, an upper rib 86b, and a notch 87b. Furthermore, the open first lower end 21 of the lower stepped chute 20 may comprise a lateral rib 83 extending from the first lower chute sidewall 85a to the second lower chute sidewall 85b. Furthermore, once the apparatus 10 is assembled, the open first lower end 21 is positioned to be linearly aligned and adjacent to the intermediate conveyor section 25.

Additionally, the lower stepped chute 20 comprises at least one lower stepped chute stiffener member 125 connecting the lower slide section 65 to the second lower stepped section 70 of the lower stepped chute 20. Moreover, the at least one lower stepped chute stiffener member 125 provides mechanical support to the lower slide section 65 and the second lower stepped section 70 of the lower stepped chute 20. The at least one lower stepped chute stiffener member 125 may comprise any suitable material, shape, and configuration and may be connected to the lower slide section 65 and the second lower stepped section 70 using any suitable retaining mechanism including the fastening and retaining mechanisms described above.

As further shown in FIGS. 4(A) through 4(I), with reference to FIGS. 1(A) through 3(I), the intermediate conveyor section 25 comprises an open first conveyor end 26, an open second conveyor end 27, a top side 28, and a bottom side 29. More particularly, the intermediate conveyor section 35 comprises a substantially open and flat/planar top side 28 and a substantially flat/planar bottom side 29. The top side 28 may be inclined or declined to provide an angled configuration of the intermediate conveyor section 25. In another example, the top side 28 may contain no incline/decline, and as such may be flat (i.e., parallel to the ground/floor). The intermediate conveyor section 25 comprises a conveyor belt base 90 on the top side 28, a pair of conveyor sidewalls 95a, 95b upwardly extending from the conveyor belt base 90, a pair of perforated ribs 100a, 100b connected to the pair of conveyor sidewalls 95a, 95b, and a pair of guide sidewalls 105a, 105b connected to the pair of conveyor sidewalls 95a, 95b. Moreover, the pair of conveyor sidewalls 95a, 95b may comprise any suitable size, shape, and configuration. The pair of conveyor sidewalls 95a, 95b may be configured to have a sufficient height to constrain parcels that are placed in the intermediate conveyor section 25. Additionally, the pair of conveyor sidewalls 95a, 95b may be configured to have a length greater than the length of the conveyor belt base 90. Furthermore, the pair of conveyor sidewalls 95a, 95b connect to the first lower chute sidewall 85a, the second lower chute sidewall 85b, and the pair of first upper chute sidewalls 50a, 50b once the apparatus 10 is assembled. The conveyor belt base 90 comprises a thickness defining a first surface 91 at the open first conveyor end 26, and a second surface 92 at the open second conveyor end 27. Moreover, the open first conveyor end 26 of the conveyor belt base 90 comprises a member 93 extending from the first surface 91.

As shown in FIG. 4(C), the conveyor belt base 90 of the intermediate conveyor section 25 may be configured to accommodate a conveyor belt 110. The conveyor belt 110 may comprise any suitable type of conveyor belt system used in the industry to transport parcels, mail, and packages. For example, the conveyor belt 110 may comprise a series of rollers that spin or a continuous loop belt that is electrically controlled. The embodiments herein are not restricted to any particular type of conveyor belt 110. Additionally, the conveyor belt 110 may be a mechanical, electro-mechanical, or magnetic belt, or a combination thereof.

The at least one sidewall stiffener member 115 connects the pair of first upper chute sidewalls 50a, 50b to the pair of conveyor sidewalls 100a, 100b and provides mechanical support to these components. Additionally, once the apparatus 10 is assembled, the pair of guide sidewalls 105a, 105b may fit through the at least one sidewall stiffener member 115, which can provide additional support and/or alignment for the connected components once assembled.

FIGS. 5(A) and 5(B), with reference to FIGS. 1(A) through 4(I), illustrates a system 200 comprising the apparatus 10 of FIGS. 1(A) through 4(I) described above. The system 200 includes an upper stepped chute 15 comprising a substantially downward sloped configuration. The upper stepped chute 15 comprises an open first upper end 16 and an open second upper end 17. The system 200 also includes a lower stepped chute 20 comprising a substantially downward sloped configuration. The lower stepped chute 20 comprises an open first lower end 21 and an open second lower end 22. The system 200 further includes an intermediate conveyor section 25 comprising an open first conveyor end 26 and an open second conveyor end 27. The open first conveyor end 26 is linearly aligned and adjacent to the open second upper end 17 of the upper stepped chute 15. Moreover, the open second conveyor end 27 is linearly aligned and adjacent to the open first lower end 21 of the lower stepped chute 20. Additionally, the intermediate conveyor section 25 upwardly inclines or declines from the open first conveyor end 26 towards the open second conveyor end 27. In another example, the intermediate conveyor section 25 does not incline/decline, and as such is flat relative to the ground/floor/base.

The system 200 may comprise a package infeed conveyor 205 adjacent to the open first upper end 16 of the upper stepped chute 15. More particularly, the package infeed conveyor 205 may be positioned adjacent to the perforated lip 121 of the upper stepped chute 15. The package infeed conveyor 205 may be any suitable type of infeed system used in the industry for delivering and loading parcels onto the upper stepped chute 15. The system 200 may also comprise a mail sorter 210 adjacent to the open second lower end 22 of the lower stepped chute 20. The mail sorter 210 may be any suitable type of mail sorting system used in the industry for sorting parcels and mail.

Furthermore, the apparatus 10 comprises at least one upper chute supporting leg 130 mechanically supporting a weight of the upper stepped chute 15. Moreover, the apparatus 10 comprises at least one lower chute supporting leg 135 mechanically supporting a weight of the lower stepped chute 20. There may be any suitable number of the at least one upper chute supporting leg 130 and the at least one lower chute supporting leg 135. According to an example, the at least one upper chute supporting leg 130 and the at least one lower chute supporting leg 135 may have an adjustable height to permit raising/lowering of some of the legs 130, 135 to provide for increases/decreases in height of the apparatus 10 and system 200 to accommodate any space restrictions in a facility housing the apparatus 10 and system 200.

Once the apparatus 10 and system 200 are assembled, the pair of perforated front walls 51a, 51b of the respective pair of upper chute sidewalls 50a, 50b of the upper stepped chute 15 align with and abut the pair of guide sidewalls 105a, 105b of the respective pair of conveyor sidewalls 95a, 95b of the intermediate conveyor section 25. Moreover, once the apparatus 10 and system 200 are assembled, the pair of perforated ribs 100a, 100b of the respective pair of conveyor sidewalls 95a, 95b of the intermediate conveyor section 25 align with and abut the upper rib 86a of the first lower chute sidewall 85a and the upper rib 86b of the second lower chute sidewall 85b of the lower stepped chute 20. Additionally, once the apparatus 10 and system 200 are assembled, the second surface 92 at the open second conveyor end 27 of the intermediate conveyor section 25 engages the notch 87a of the first lower chute sidewall 85a and the notch 87b of the second lower chute sidewall 85b of the lower stepped chute 20.

The perforations described above with respect to the various components and sub-assemblies allow for retaining mechanisms to be inserted therein for connection of the various components together. Furthermore, multiple perforations in the respective components allows for some flexibility in positioning retaining mechanisms to accommodate variances in structural tolerances of the respective components. Additionally, as indicated above, any suitable type of retaining mechanisms may be utilized to assemble the apparatus 10 and system 200.

The unique arrangement of the various components and sub-assemblies provided by the apparatus 10 and system 200 of the embodiments herein achieve both attributes of the aforementioned high-density mail environment and maximizes accumulation, controls the flow to downstream mail handling operations, and minimizes mail and parcel damage. Additionally, the unique configuration of the apparatus 10 and system 200 allows for increased efficiencies in the mail sorting environment and helps to eliminate damages to packages by using the tiered sub-assemblies with the intermediary intermediate conveyor section 25. Furthermore, the apparatus 10 and system 200 greatly increases throughput of mail and parcels in the transportation process.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An apparatus comprising:
    an upper stepped chute comprising a substantially downward sloped configuration;
    a lower stepped chute comprising a substantially downward sloped configuration; and
    an intermediate conveyor section separating the upper stepped chute from the lower stepped chute, wherein the intermediate conveyor section comprises a slope that is different from the slope of the upper stepped chute and the lower stepped chute, and wherein the slope of the intermediate conveyor section comprises an approximately 10° incline or decline from the upper stepped chute towards the lower stepped chute.

2. The apparatus of claim 1, wherein the upper stepped chute comprises:
    a first upper section arranged in a downwardly inclined configuration;
    a first upper stepped section downwardly extending from the first upper section;
    a second upper section downwardly extending from the first upper stepped section; and
    a second upper stepped section downwardly extending from the second upper section.

3. The apparatus of claim 2, wherein the second upper stepped section is adjacent to the intermediate conveyor section.

4. The apparatus of claim 2, wherein the upper stepped chute comprises:
    a pair of first upper chute sidewalls upwardly extending from the first upper section, the first upper stepped section, and the second upper section; and
    a pair of second upper chute sidewalls upwardly extending from the pair of first upper chute sidewalls.

5. The apparatus of claim 4, wherein the lower stepped chute comprises:
    a first lower stepped section arranged in a downwardly inclined configuration extending from the intermediate conveyor section;
    a lower slide section downwardly extending from the first lower stepped section; and a second lower stepped section downwardly extending from the lower slide section.

6. The apparatus of claim 5, wherein the lower stepped chute comprises:
a flared bottom portion connected to the second lower stepped section; and
an angled sidewall extending from the flared bottom portion.

7. The apparatus of claim 6, wherein the lower stepped chute comprises:
a first lower chute sidewall upwardly extending from the lower slide section; and
a second lower chute sidewall upwardly extending from the lower slide section,
wherein the angled sidewall connects to the first lower chute sidewall, and
wherein the angled sidewall is angled with respect to the first lower chute sidewall.

8. The apparatus of claim 7, wherein the intermediate conveyor section comprises:
a conveyor belt base;
a pair of conveyor sidewalls upwardly extending from the conveyor belt base;
a pair of perforated ribs connected to the pair of conveyor sidewalls; and
a pair of guide sidewalls connected to the pair of conveyor sidewalls,
wherein the pair of conveyor sidewalls connect to the first lower chute sidewall, the second lower chute sidewall, and the pair of first upper chute sidewalls.

9. The apparatus of claim 8, wherein the conveyor belt base of the intermediate conveyor section is configured to accommodate a conveyor belt.

10. The apparatus of claim 8, comprising at least one sidewall stiffener member connecting and supporting the pair of first upper chute sidewalls to the pair of conveyor sidewalls.

11. The apparatus of claim 5, comprising at least one lower stepped chute stiffener member connecting and supporting the lower slide section to the second lower stepped section of the lower stepped chute.

12. The apparatus of claim 2, wherein the second upper section and the second upper stepped section are pivotally connected to each other.

13. The apparatus of claim 1, comprising at least one upper chute supporting leg mechanically supporting a weight of the upper stepped chute.

14. The apparatus of claim 1, comprising at least one lower chute supporting leg mechanically supporting a weight of the lower stepped chute.

15. The apparatus of claim 1, comprising at least one conveyor support leg mechanically supporting a weight of the intermediate conveyor section.

16. An apparatus comprising:
an upper stepped chute comprising a substantially downward sloped configuration, wherein the upper stepped chute comprises:
a first upper section arranged in a downwardly inclined configuration;
a first upper stepped section downwardly extending from the first upper section;
a second upper section downwardly extending from the first upper stepped section; and
a second upper stepped section downwardly extending from the second upper section;
at least one upper stepped chute stiffener member connecting and supporting the first upper section to the first upper stepped section of the upper stepped chute;
a lower stepped chute comprising a substantially downward sloped configuration; and
an intermediate conveyor section separating the upper stepped chute from the lower stepped chute, wherein the intermediate conveyor section comprises a slope that is different from the slope of the upper stepped chute and the lower stepped chute.

17. A system comprising:
an upper stepped chute comprising a substantially downward sloped configuration, wherein the upper stepped chute comprises an open first upper end and an open second upper end;
a lower stepped chute comprising a substantially downward sloped configuration, wherein the lower stepped chute comprises an open first lower end and an open second lower end; and
an intermediate conveyor section comprising an open first conveyor end and an open second conveyor end, wherein the open first conveyor end is adjacent to the open second upper end of the upper stepped chute, wherein the open second conveyor end is adjacent to the open first lower end of the lower stepped chute, wherein the intermediate conveyor section upwardly inclines or declines from the open first conveyor end towards the open second conveyor end, and wherein the slope of the intermediate conveyor section comprises an approximately 10° incline or decline from the upper stepped chute towards the lower stepped chute.

18. The system of claim 17, comprising a package infeed conveyor adjacent to the open first upper end of the upper stepped chute.

19. The system of claim 17, comprising a mail sorter adjacent to the open second lower end of the lower stepped chute.

20. An apparatus comprising:
an upper stepped chute comprising a substantially downward sloped configuration, wherein the upper stepped chute comprises:
a first upper section arranged in a downwardly inclined configuration;
a first upper stepped section downwardly extending from the first upper section;
a second upper section downwardly extending from the first upper stepped section; and
a second upper stepped section downwardly extending from the second upper section, wherein the second upper section and the second upper stepped section are pivotally connected to each other;
a lower stepped chute comprising a substantially downward sloped configuration; and
an intermediate conveyor section separating the upper stepped chute from the lower stepped chute, wherein the intermediate conveyor section comprises a slope that is different from the slope of the upper stepped chute and the lower stepped chute.

* * * * *